United States Patent
Barber, Jr.

(10) Patent No.: US 6,413,287 B1
(45) Date of Patent: *Jul. 2, 2002

(54) METHOD FOR MAKING AN ABRASIVE ARTICLE AND ABRASIVE ARTICLES THEREOF

(75) Inventor: Loren L. Barber, Jr., Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/605,608

(22) Filed: Jun. 28, 2000

Related U.S. Application Data

(63) Continuation of application No. 09/250,822, filed on Feb. 17, 1999, now Pat. No. 6,179,887.

(51) Int. Cl.$^7$ .................... B24D 11/00; A46B 1/00; A46B 13/00; A46D 1/00
(52) U.S. Cl. .................... 51/298; 51/307; 51/309; 51/293; 51/308; 451/527; 451/533
(58) Field of Search .................... 51/298, 307, 309, 51/293, 308; 451/527, 533, 550

(56) References Cited

U.S. PATENT DOCUMENTS

| | | |
|---|---|---|
| 1,910,444 A | 5/1933 | Nicholson |
| 3,041,156 A | 6/1962 | Rowse et al. .................... 51/298 |
| 3,270,467 A | 9/1966 | Block et al. .................... 51/358 |
| 3,522,342 A | 7/1970 | Nungesser et al. .......... 264/210 |
| 3,562,968 A | 2/1971 | Johnson et al. ................ 51/389 |
| 3,667,170 A | 6/1972 | MacKay, Jr. .................. 51/389 |
| 3,947,169 A | 3/1976 | Wolff et al. .................... 425/71 |
| 4,255,164 A | 3/1981 | Butzke et al. .................. 51/295 |
| 4,311,489 A | 1/1982 | Kressner ...................... 51/298 |
| 4,314,827 A | 2/1982 | Leitheiser et al. ............. 51/298 |
| 4,328,322 A | 5/1982 | Baron ........................ 521/163 |
| 4,576,612 A | 3/1986 | Shukla et al. ................. 51/295 |
| 4,609,581 A | 9/1986 | Ott ............................. 428/100 |
| 4,623,364 A | 11/1986 | Cottringer et al. ............. 51/309 |
| 4,644,703 A | 2/1987 | Kaczmarek et al. .......... 51/401 |
| 4,652,274 A | 3/1987 | Boettcher et al. .............. 51/298 |
| 4,652,275 A | 3/1987 | Bloecher et al. ............... 51/298 |
| 4,668,736 A | 5/1987 | Robins et al. .................. 525/65 |
| 4,733,502 A | 3/1988 | Braun ......................... 51/284 |
| 4,735,632 A | 4/1988 | Oxman et al. ................. 51/295 |
| 4,744,802 A | 5/1988 | Schwabel ..................... 51/309 |
| 4,751,138 A | 6/1988 | Tumey et al. ................ 428/323 |
| 4,770,671 A | 9/1988 | Monroe et al. ................ 51/293 |
| 4,799,939 A | 1/1989 | Bloecher et al. ............... 51/293 |
| 4,875,259 A | 10/1989 | Appeldorn .................... 24/576 |
| 4,881,951 A | 11/1989 | Wood et al. ................... 51/309 |
| 4,903,440 A | 2/1990 | Larson et al. ................. 51/298 |
| 4,918,874 A | 4/1990 | Tiefenbach, Jr. .............. 51/293 |
| 4,964,883 A | 10/1990 | Morris et al. .................. 51/293 |
| 4,997,461 A | 3/1991 | Markhoff-Matheny et al. ........................ 51/295 |
| 5,009,675 A | 4/1991 | Kunz et al. .................... 51/295 |
| 5,011,508 A | 4/1991 | Wald et al. .................... 51/293 |
| 5,014,468 A | 5/1991 | Ravipati et al. ............... 51/295 |
| 5,039,311 A | 8/1991 | Bloecher ...................... 51/295 |
| 5,042,991 A | 8/1991 | Kunz et al. .................... 51/295 |
| 5,045,091 A | 9/1991 | Abrahamson et al. ......... 51/293 |
| 5,077,870 A | 1/1992 | Melbye et al. ................. 24/452 |
| 5,152,917 A | 10/1992 | Pieper et al. .................. 51/295 |
| 5,164,348 A | 11/1992 | Wood .......................... 501/127 |
| 5,174,795 A | 12/1992 | Wiand ......................... 51/295 |
| 5,213,591 A | 5/1993 | Celikkaya et al. ............. 51/293 |
| 5,232,470 A | 8/1993 | Wiand ......................... 51/295 |
| 5,233,719 A | 8/1993 | Young et al. .................. 15/179 |

(List continued on next page.)

FOREIGN PATENT DOCUMENTS

| | | | |
|---|---|---|---|
| DE | 0 330 512 | 11/1984 | ............ B24D/3/00 |
| EP | 0 650 803 B1 | 3/1999 | ............ B24B/7/24 |
| GB | 1 327 653 | 8/1973 | ............ B26F/1/00 |
| GB | 2 043 501 | 10/1980 | ............ B24D/11/00 |
| WO | WO 95/00295 | 1/1995 | ............ B24D/11/00 |
| WO | WO 95/19242 | 7/1995 | ............ B24D/11/00 |
| WO | Wo 96/33638 | 10/1996 | ............ A46B/1/00 |
| WO | WO 97/05990 | 2/1997 | ............ B24D/11/00 |
| WO | WO 97/11484 | 3/1997 | ....... H01L/21/3105 |
| WO | WO 97/14535 | 4/1997 | ............ B24D/3/34 |
| WO | WO 98/12021 | 3/1998 | ............ B24D/3/28 |

OTHER PUBLICATIONS

Burns, "Getting Started in DCPD RIM Molding", *Plastics Technology*, pp. 62–69, Mar. 1989.
Burns, "Micro–Rim' Replaces Injection Molding in Electronic Encapsulation", *Plastics Technology*, pp. 39–44, (1998) (No month).
"Engineering Polymers—Properties Guide: Thermoplastics and Polyurethanes", Brochure from the Polymers Divisin of Bayer Corporation, pp. 1–32 (1987) (No month).
Evans, "New Equipment for Lower–Cost RIM", *Plastics Technology*, pp. 37–39, (1990) (No month).
Fujiwara et al., "Reactive Processing of Thermoset/Thermoplastic Blends: A Potential for Injection Molding", *Polymer Engineering and Science*, vol. 36, No. 11, pp. 1541–1546 (1996) (No month).
"Injection Molding—Bucher upgrades thermoset technology", *Plastics World*, pp. 24–24 (1989) (No month).

(List continued on next page.)

*Primary Examiner*—Michael Marcheschi
(74) *Attorney, Agent, or Firm*—Gregory D. Allen

(57) ABSTRACT

Reaction injection molding is utilized as a method for making an abrasive article that includes supplying an effective amount of abrasive particles to at least a portion of an abrasive article mold and supplying a binder precursor matrix that includes at least two interactive components to the abrasive article mold. When the binder precursor matrix is cured, the abrasive particles are secured within a binder formed from the binder precursor matrix. An abrasive article includes a plurality of bristles including an increased amount of abrasive particles, wherein a ratio of binder to abrasive particles is at least about 1:3 by weight.

3 Claims, 9 Drawing Sheets

U.S. PATENT DOCUMENTS

| | | | |
|---|---|---|---|
| 5,233,794 A | 8/1993 | Kikutani et al. .............. | 51/206 |
| 5,236,472 A | 8/1993 | Kirk et al. .................... | 51/298 |
| 5,254,194 A | 10/1993 | Ott et al. ..................... | 156/176 |
| 5,256,170 A | 10/1993 | Harmer et al. ................ | 51/293 |
| 5,273,558 A | 12/1993 | Nelson et al. ................ | 51/298 |
| 5,304,223 A | 4/1994 | Pieper et al. ................. | 51/293 |
| 5,316,812 A | 5/1994 | Stout et al. ................... | 428/64 |
| 5,368,619 A | 11/1994 | Culler .......................... | 51/308 |
| 5,400,458 A | 3/1995 | Rambosek ................... | 15/179 |
| 5,427,595 A | 6/1995 | Pihl et al. ..................... | 51/298 |
| 5,435,816 A | 7/1995 | Spurgeon et al. ............ | 51/295 |
| 5,460,883 A | 10/1995 | Barber, Jr. et al. ......... | 428/370 |
| 5,505,747 A | 4/1996 | Chesley et al. .............. | 51/297 |
| 5,580,647 A | 12/1996 | Larson et al. ............... | 428/245 |
| 5,607,488 A | 3/1997 | Wiand ......................... | 51/295 |
| D381,139 S | 7/1997 | Johnson et al. ............. | D32/25 |
| 5,679,067 A | 10/1997 | Johnson et al. .............. | 51/298 |
| 5,681,217 A | 10/1997 | Hoopman et al. .......... | 451/528 |
| 5,782,682 A | 7/1998 | Han et al. .................... | 451/548 |
| 5,849,052 A | 12/1998 | Barber, Jr. ................... | 51/298 |
| 5,903,951 A | 5/1999 | Ionta et al. .................. | 451/466 |
| 6,179,887 B1 * | 1/2001 | Barber, Jr. ................... | 51/298 |

OTHER PUBLICATIONS

Kim et al., "Rubber Modified Epoxy Resin. III: Reaction Injection Molding Process", *Polymer Engineering and Science*, vol. 3, pp. 564–576 (1995) (No month).

McMahon, "An introduction to reaction injection molding", *Advanced Materials & Processes*, pp. 37–38 (1995) (No month).

Muller et al., "New Developments in Isocyanate–Based Casting Resins for the Electrical and Electronics Industry", reprinted from *Advances in Urethane Science and Technology*, vol. 12, pp. 166–207 (undated).

Nguyen et al., "Processing of Polyurethane/Polyester Interpenetrating Polymer Networks by Reaction Injection Molding. Part III: Flow Reorientation Through Multiple Impingement", *Polymer Engineering and Science*, vol. 26, pp. 843–853 (1986) (No month).

Osinski, "Characterization of Fast–Cure Resins for Reaction Injection Molding", *Polymer Engineering and Science*, vol. 23, pp. 756–762 (1983) (No month).

Pannone et al., "Reaction Kinetics of a Polyurea Reaction Injection Molding System", *Polymer Engineering and Science*, vol. 28, pp. 660–669 (1988) (No month).

Schlotterbeck et al., "Materials: Polyurea/Amide Elastomers—a New RIM Generation Debuts", *Plastics Engineering*, pp. 37–40 (1989) (No month).

Viola et al., "Isocyanate Trimerization Kinetics and Heat Transfer in Structural Reaction Injection Molding", *Polymer Engneering and Science*, vol. 34, No. 15, pp. 1173–1186 (1994) (No month).

Watts, "Abrasive Monofilaments—Critical Factors that Affect Brush Tool Performance", Society of Manufacturing Engineers Technical Paper (1988) (No month).

Willkomm et al., "Properties and Phase Separation of Reaction Injection Molded and Solution Polymerized Polyureas as a Function of Hard Block Content", *Polymer Engineering and Science*, vol. 2, pp. 888–900 (1988) (No month).

* cited by examiner

METHOD FOR MAKING AN ABRASIVE ARTICLE AND ABRASIVE ARTICLES THEREOF

This is a continuation of Application Ser. No. 09/250,822 filed Feb. 17, 1999, U.S. Pat. No. 6,179,887.

FIELD OF THE INVENTION

The present invention relates to an abrasive article, such as an abrasive brush, including a binder and a plurality of abrasive particles and a method of making such an abrasive article by reaction injection molding.

BACKGROUND OF THE INVENTION

Brushes have been used for many years to polish, clean and abrade a wide variety of substrates. These brush products typically have a plurality of bristles that contact the substrate. Abrasive particles can be added to bristles to increase their abrasiveness. There are many manufacturing steps necessary to manufacture a conventional abrasive brush having bristles which contain abrasive particles. A mixture of abrasive particles and a thermoplastic binder may be combined and then extruded to form a bristle. The bristle is then cut to the desired length. A plurality of these bristles are then mechanically combined to form a brush segment. Next, a plurality of these brush segments may be installed on a hub or plate to form a brush.

One example of such a brush is disclosed in U.S. Pat. No. 5,045,091 (Abrahamson et al.). In Abrahamson et al., a plurality of abrasive bristles are mechanically clamped together and a root system is installed to form a brush segment. A plurality of these brush segments are installed on a rotary hub. Another arrangement for mechanically mounting bristles on a hub to form a brush segment is disclosed in U.S. Pat. No. 5,233,719 (Young et al.). Young et al. teach a brush segment comprising a substrate with a carpet of bristles mounted on one side of the substrate, by means of a polymeric resin for example, and a root system extending from the opposite side of the substrate for engagement with a rotary hub. U.S. Pat. No. 5,400,458 (Rambosek) teaches a brush segment having a plurality of bristles embedded in a polymeric base portion. A root means for attaching the segment to a hub can be integrally molded with the base.

U.S. Pat. No. 5,233,794 (Kikutani et al.) discloses a rotary tool having a rotating tip formed integrally with a shaft. The rotary tool is formed of a thermosetting resin containing inorganic long fibers with a high degree of hardness as an abrasive means in an amount from 50% to 81% by volume. The long inorganic fibers can have a diameter in the range of 3 $\mu$m to 30 $\mu$m. In one of the embodiments of Kikutani et al., the rotating tip is formed as a column or cylinder with elements which correspond to the bristle of a brush extending from the tip.

U.S. Pat. Nos. 5,152,917 and 5,304,223 (Pieper et al.) teach coated abrasive articles comprising precisely shaped abrasive composites bonded to a backing. The abrasive composites comprise binder and abrasive particles. The precisely shaped composites can be in the form of, for example, pyramids, sawtooth grooves, or linear grooves. The maximum distance between corresponding points on adjacent composite shapes can be less than one millimeter. The coated abrasive of Pieper et al. can be made, for example, according to the following general procedure. First, a slurry containing abrasive grains and binder is introduced to a production tool. Second, a backing is introduced to the outer surface of the production tool such that the slurry wets the front side of the backing. Third, the binder is at least partially cured. Fourth, the production tool is removed from the backing.

U.S. Pat. Nos. 5,174,795 and 5,232,470 (Wiand) teach a planar abrasive article comprising a sheet portion with a plurality of protrusions extending therefrom. Abrasive particles are homogeneously dispersed throughout the moldable material comprising the article. Wiand teaches one embodiment having short protrusions extending 1.6 mm (0.063 in.) from the backing and having a 3.2 mm (0.125 in.) diameter, and another embodiment having short protrusions extending 1.3–1.5 mm (0.05–0.06 in.) from the backing and having a 1.3 mm (0.05 in.) diameter.

G.B. Patent Application No. 2,043,501 (Dawkins) discloses an abrasive article for polishing ophthalmic workpieces. The abrasive article is made by injection molding a mixture of abrasive grains and a thermoplastic binder to form an abrasive article comprising a flexible backing having a plurality of upstanding projections, the ends of which act as operative abrading surfaces.

U.S. Pat. No. 5,427,595 (Pihl et al.) discloses an extruded abrasive filament including a first elongate filament component having a continuous surface throughout its length and including a first hardened organic polymeric material and a second elongate filament component coterminous with the first elongate filament component, including a second hardened organic polymeric material in melt fusion adherent contact with the first elongate filament component along the continuous surface. The second hardened organic polymeric material can be the same or different than the first hardened organic polymeric material. At least one of the first and second hardened organic polymeric materials includes a thermoplastic elastomer having abrasive particles adhered therein. Also disclosed is an abrasive article comprised of at least one abrasive filament mounted to a substrate such as a hub adapted to be rotated at high speed.

Polyamide, also known as "nylon", filaments were developed in the late 1950's as a synthetic alternative to natural filaments. At about that time an extrusion process was developed for dispersing abrasive particles uniformly in a nylon matrix in the form of a filament (U.S. Pat. Nos. 3,522,342 and 3,947,169). A review of polyamide abrasive filaments is presented by Watts, J. H., "Abrasive Monofilaments-Critical Factors that Affect Brush Tool Performance", Society of Manufacturing Engineers Technical Paper, 1988, a written version of a presentation by the author at the WESTEC Conference, held Mar. 21–24, 1988. It is known to use conventional inorganic abrasive particles with such polyamide filaments. As explained by Watts, as filaments of this type wear, new abrasive particles are exposed. An abrasive filament brush tool made using a plurality of these filaments is thus regenerated during use. While adequate for many purposes, various polyamides have property limitations which make their use less than optimal for certain applications of abrasive filaments.

U.S. Pat. No. 5,460,883, (Barber, Jr., et al.) describes the use of thermoplastic elastomers in abrasive filaments to reduce or overcome such limitations of polyamide filaments.

An abrasive brush and filaments are described in International Publication No. WO 96/33638 (Johnson et al.), published on Oct. 31, 1996. Johnson et al. report that moldable polymers can be used in brushes, brush segments and filaments. Preferably, the moldable polymer is an organic binder material that is capable of being molded, i.e., it is capable of deforming under heat to form a desired shape. Johnson et al. teach that desirable moldable polymers may be a thermoplastic polymer, a thermosetting polymer, a thermoplastic elastomer, and mixtures thereof. Johnson et al. also teach that thermoplastic elastomers may be used in processes such as injection molding, extrusion, blow molding, and the like. Injection molding, as taught by Johnson et al., provides placing a mixture of pellets including a moldable polymer and, optionally, abrasive particles in a hopper which feeds the mixture into a first or rear side of a screw injector. The softened mixture is then passed into a mold, wherein the screw injector includes a heated barrel for melting the mixture, while a rotating screw within the barrel propels the mixture into the mold. Thus, as described by Johnson et al., injection molding utilizes a single moldable polymer source from which to feed the screw injector and, subsequently, the mold.

SUMMARY OF THE INVENTION

There is a need to provide an abrasive article, such as an abrasive brush, that is easily, rapidly, and inexpensively manufactured. An abrasive article so manufactured preferably provides suitable durability and abrading characteristics. There is also a need to provide an abrasive brush having abrasive particles that can remove foreign material from a workpiece surface efficiently without damage to the workpiece surface, or that is capable of providing a desired finish to the workpiece surface.

One aspect of the present invention is a method for making an abrasive article that is easy, fast, and inexpensive, and which provides a suitable abrasive article that is sufficiently durable and possesses acceptable abrading characteristics. Preferably, a method for making an abrasive article includes supplying an effective amount of abrasive particles to at least a portion of an abrasive article mold, wherein the abrasive article mold comprises a plurality of bristle segment portions; supplying a binder precursor matrix to the abrasive article mold, wherein the binder precursor matrix comprises at least two interactive components capable of forming a binder selected from the group consisting of a polyurethane/urea binder and an epoxy binder; and allowing the binder precursor matrix to cure within the abrasive article mold such that the abrasive particles are secured within a binder formed from the binder precursor matrix. More preferably, the method according to the invention includes reaction injection molding or RIM.

As used herein, "an effective amount of abrasive particles" refers to that amount of abrasive particles added during a method of making an abrasive article such that the resulting abrasive brush can remove foreign material from a workpiece surface efficiently without damage to the workpiece surface, or is capable of providing a desired finish to the workpiece surface.

As used herein, "RIM" refers to reaction injection molding that relates to a production method that includes mixing and reacting one or more, preferably two or more, chemical components to form a solid structure. Preferably, the two or more chemical components are supplied as interactive liquid components. As used herein, "RIM" also refers to and includes RRIM and SRIM. "RRIM" generally refers to reinforced reaction injection molding wherein fillers are typically added to at least one of the interactive chemical components. Fillers generally include such materials as milled glass, chopped glass, and flake glass. "SRIM" generally refers to structural reaction injection molding that typically includes reinforcing materials, such as glass fiber preform, in the mold where the chemical components are injected to solidify around the preform.

As used herein, "interactive" means that the components of the binder precursor matrix undergo a mechanism with each other such as covalent bonding, hydrogen bonding, ionic bonding, van der Waals' forces, and the like, that may result in crosslinking and/or chain extending of the components.

As used herein, "cure time" refers to a period of time required for a complete interaction to take place between the components of the binder precursor matrix such that the physical nature of the matrix irreversibly changes to form a binder. For example, the physical state of the binder precursor matrix may change to another state to form the binder, such as from a substantially liquid state to a substantially solid state.

A method in accordance with the present invention preferably includes supplying the binder precursor matrix to the abrasive article mold by supplying each of the at least two interactive components separately to a mixer prior to supplying the binder precursor matrix to the abrasive article mold.

In one embodiment, the binder precursor matrix forms a polyurethane/urea binder having a soft segment to hard segment ratio of about 10:1 to about 1:2. Preferably, the binder precursor matrix includes a first component selected from the group consisting of an amine, a polyol, or a mixture thereof, wherein the first component has an average amine and/or hydroxy functionality of at least about 2 and an equivalent weight of at least about 30 grams and less than about 10,000 grams per equivalent; and a second component comprising a polyfunctional isocyanate having an average isocyanate functionality of at least 2 and an equivalent weight of at least about 80 grams and less than about 5000 grams per equivalent. The binder precursor matrix may further include a chain extender.

In another embodiment, the binder precursor matrix includes a first component comprising a glycidyl ether expoxide group containing material. and a second component comprising an amino-terminated aliphatic polyether curing agent. The binder precursor matrix may further include a polymeric toughening agent having both a rubbery phase and a thermoplastic phase or being capable of forming, with the epoxide group containing material, both a rubbery phase and a thermoset phase on curing; and a catalyst capable of providing an exotherm of at least about 20° C.

Preferably, supplying a plurality of abrasive particles to an abrasive article mold includes filling the abrasive particles in at least some of the plurality of bristle segment portions of the mold. More preferably, the step of supplying a plurality of abrasive particles to at least a portion of an abrasive article mold includes filling at least about 50% by volume to at least some of a plurality of bristle segment portions of the mold with abrasive particles.

In accordance with the present invention, the step of supplying a binder precursor matrix to the abrasive article mold typically occurs after the step of supplying a plurality of abrasive particles to at least a portion of an abrasive article mold.

The method may also include adding an optional additive to the binder precursor matrix, wherein the optional additive is preferably selected from the group consisting of a filler, a fiber, an antistatic agent, an antioxidant, a catalyst, a processing aid, a dessicant, a UV stabilizer, a flame retardant, a lubricant, a wetting agent, a surfactant, a pigment, a dye, a coupling agent, a plasticizer, a suspending agent, and combinations thereof.

Another aspect of the present invention provides an abrasive article produced by the method described above, wherein a plurality of bristles of the abrasive article includes a binder formed from the binder precursor matrix and a plurality of abrasive particles adhered together within the binder, wherein the binder and the plurality of abrasive particles are in a ratio of about 1:3 or more by weight.

Another aspect of the present invention provides a method for making an abrasive article that includes filling a plurality of abrasive particles to about a 50% by volume of at least a portion of a plurality of bristle segments of an abrasive article mold. The method also includes supplying a binder precursor matrix comprising at least two interactive components to the abrasive article mold, wherein a first component is selected from the group consisting of a polyurea or polyurethane/urea which results from the polymerization of a polyfunctional amine having functionality of at least 2 and an equivalent weight of at least about 300 and a polyfunctional isocyanate prepolymer having functionality of at least 2 and an equivalent weight of at least about 300; and a second component is selected from the group consisting of a polymerized polyfunctional isocyanate or polyfunctional amine having a functionality of at least about 2 and equivalent weight of less than about 300; and allowing the binder precursor matrix to cure within the abrasive article mold such that the abrasive particles are secured within a binder formed from the binder precursor matrix, wherein the binder includes a soft segment to hard segment ratio of about 10:1 to about 1:2.

A further aspect of the present invention provides a method for making an abrasive article that includes filling a plurality of abrasive particles to about a 50% by volume of at least a portion of a plurality of bristle segments of an abrasive article mold. The method also includes supplying a binder precursor matrix comprising at least two interactive components to the abrasive article mold, wherein a first component comprises a glycidyl ether monomer of the formula:

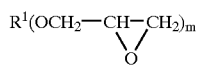

where $R^1$ is alkyl or aryl and m is an integer from 1 to 6; and a second component comprising a polyether diamine having the formula

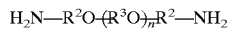

wherein $R^2$ is a straight or branched chain alkylene group having 2 to 4 carbon atoms, $R^3$ is an hydrocarbolene group having 2 to 8 carbon atoms selected from straight and branched chain alkylene groups having 2 to 4 carbon atoms, cycloalkylene groups having 4 to 8 carbon atoms, and arene groups having 6 to 8 carbon atoms, and n is an integer from 1 to 10 such that the average molecular weight of the compound is from about 175 to about 750; and allowing the binder precursor matrix to cure within the abrasive article mold such that the abrasive particles are secured within a binder formed from the binder precursor matrix, wherein the binder and the plurality of abrasive particles are in a ratio of about 1:3 or more by weight.

Yet another aspect of the present invention provides an integrally molded abrasive article that includes a generally planar base having a first side and a second side; a plurality of bristles integrally molded with and extending from the first side of the base; wherein: the base comprises a binder formed from the binder precursor matrix comprising at least two interactive components and is essentially free of abrasive particles; and at least a portion of the plurality of bristles comprise a plurality of abrasive particles adhered within the binder such that the ratio of binder to abrasive particles is at least about 1:3 by weight. Preferably, the binder is selected from a polyurethane/urea binder or an epoxy binder. The plurality of abrasive particles preferably include a material selected from an inorganic material, an organic material, or an agglomerate thereof. The integrally molded abrasive article may further include an attachment constituent on the second side of the base.

BRIEF DESCRIPTION OF THE SEVERAL VIEWS OF THE DRAWINGS

The present invention will be further explained with reference to the several views of the drawings, wherein like structure is referred to by like numerals throughout the several views.

Other features, advantages, and further methods of practicing the invention will be better understood from the following description of figures and the preferred embodiments of the present invention.

DETAILED DESCRIPTION OF PREFERRED EMBODIMENTS

In one aspect of the present invention, a method for making an abrasive article, such as a molded abrasive brush, is provided. Other aspects of the invention relate to an abrasive article and a method of using an abrasive article.

Method for Making Abrasive Articles

A method for making an abrasive article in accordance with the present invention includes the steps of supplying an effective amount of abrasive particles to at least a portion of an abrasive article mold, wherein the abrasive article mold comprises a plurality of bristle segment portions; supplying a binder precursor matrix of at least two interactive components to the abrasive article mold, wherein the abrasive article mold comprises a plurality of bristle segment portions; and allowing the binder precursor matrix to cure within the abrasive article mold such that the abrasive particles are secured within a binder formed from the binder precursor matrix. Preferably, supplying an effective amount of abrasive particles to at least a portion of an abrasive article mold is accomplished by filling the abrasive particles in a plurality of bristle segment portions of the abrasive article mold. More preferably, supplying an effective amount of abrasive particles to at least a portion of an abrasive article mold is accomplished by filling at least about 50% by volume, preferably about 75% by volume, in at least some of a plurality of bristle segment portions of the abrasive article mold with abrasive particles. Even more preferably, the method includes the step of supplying a binder precursor matrix to the abrasive article mold after the step of filling the abrasive particles in the plurality of bristle segment portions of the abrasive article mold.

It was surprisingly found that in practicing a method in accordance with the present invention, an abrasive article was produced having a binder to abrasive particle ratio of at least about 1:3, typically about 1:4 or more, in the bristle portion of the abrasive article and, thus, concentrating the abrasive particles in the working or abrading portion of the abrasive article. It was also surprising that increasing the abrasive particle amount in the working portion of the abrasive article did not substantially adversely affect the abrasive article during abrading processes, as might be expected. For example, it was expected that increasing the abrasive particle concentration in the bristles of an abrasive article would create such adverse effects as increased abrasive article failure because bristles would break away from the abrasive article base during abrading.

Figure 1:
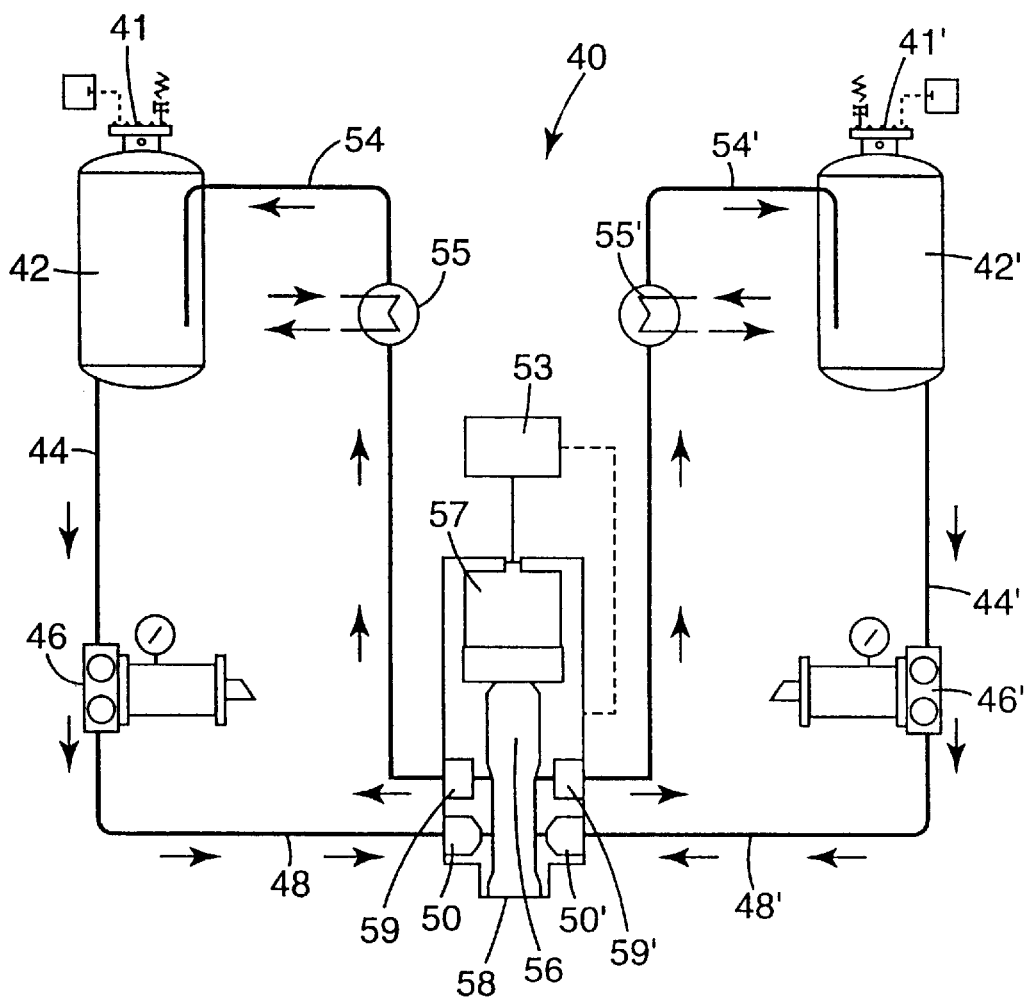
FIG. 1 is a schematic illustration of an apparatus and method for carrying out the present invention.

Preferably, the method includes reaction injection molding (RIM, as defined above). RIM techniques are known in the art. In a typical RIM technique, a RIM apparatus 40 can be used as is illustrated in FIG. 1.

Binder precursor matrix components are typically included in RIM techniques as liquids. As liquids, they can be held in storage reservoirs 42 and 42', where there are two interactive components of the binder precursor matrix. The storage reservoirs 42 and 42' may be held at sufficient temperature so that the components are conditioned to the processing temperature, for example about 20° C. to about 90° C. Accordingly, the storage reservoirs 42 and 42' may include a temperature regulator device 41 and 41' as is known in the art.

Feed lines 44 and 44' fluidly connect the storage reservoirs 42 and 42' to metering pumps 46 and 46', respectively. Metering pumps are preferably calibrated such that the components of the binder precursor matrix are precisely measured in a required volume and ratio to one another for delivery to a mixing head 56 via injection nozzle feed lines 48 and 48'. Suitable metering pumps are known in the art and include piston pumps, gear pumps, and the like.

Precisely measured components flow through the injection feed lines 48 and 48', through injection nozzles 50 and 50', respectively, to a mixing head 56. In the mixing head 56, the injected components are mixed. Mixing of the components can be accomplished utilizing a variety of mixing means, such as by a hydraulic impinger 57. Other suitable mixing means may include stirring devices, agitators, static mixers, and the like. Once the components are mixed to form a binder precursor matrix, they then exit the RIM apparatus 40 through the RIM outlet 58 for subsequent delivery to an abrasive article mold. Delivery of the mixed components can be accomplished by a variety of known techniques, such as by injection to a closed mold or by pouring into an open mold, to name a few.

If desired, optional materials, such as additives, fillers, etc., may be added to one or more of the components. In order for the optional materials to remain substantially uniformly dispersed within the component, the storage reservoirs (42, 42') may be equipped with a mixing device, such as an agitator or stirring device. Additionally, and optionally, the RIM apparatus 40 may be equipped with recirculating lines 54 and 54'. The flow of the components through the recirculating lines (54, 54') may be controlled by control means 53 which control valves 59 and 59'. By directing valve 59 (and 59') to one position, the component returns to the storage reservoir 42 (and 42') via recirculating line 54 (and 54'). By directing valve 59 (and 59') to a second position, the component passes through the injection nozzle 50 (and 50') to the mixing head 56. It may be desirable to provide such a recirculating line in a RIM apparatus as a means for continuous mixing so that the optional material in the component remains substantially evenly dispersed. Additionally, an optional heat exchanger 55 (and 55') may be added to each recirculating line such that the temperature of the component returning to the storage reservoir 42 (and 42') may be regulated.

One with ordinary skill in the art will recognize that if the binder precursor matrix includes more than two interactive components, a RIM apparatus will include a number of storage reservoirs, feed lines, metering pumps, injection nozzles, etc., that corresponds to the number of components of the binder precursor matrix.

Figure 2:
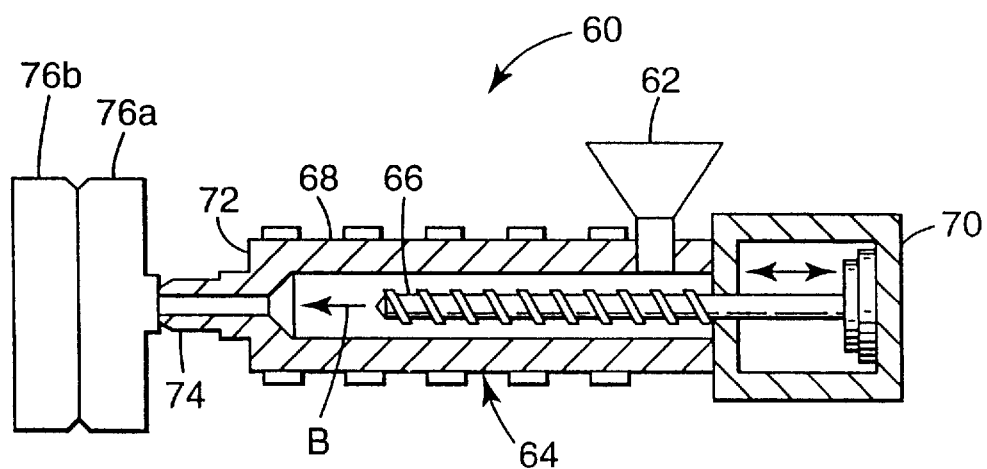
FIG. 2 is a schematic illustration of a known apparatus and method for making an abrasive article.

In contrast with the present invention, a conventional injection method is typically accomplished by an apparatus as shown in FIG. 2. Injection molding techniques are known in the art, wherein a binder material is preferably heated until it is in a substantially molten state, then extruded through a screw injector into a mold, and the molten binder material is subsequently cooled to form an article. A typical injection molding apparatus 60 for making an abrasive article is illustrated in FIG. 2. After preferably being dried by heating, a mixture of pellets comprising a moldable polymer, typically a thermoplastic polymer, and, optionally, abrasive particles are placed in a hopper 62. The hopper feeds the mixture into a first or rear side 70 of a screw injector 64 generally comprising a screw 66 within a barrel 68. The opposite side, or front side 72 of the screw injector 64 comprises a nozzle 74 for passing the softened mixture into a mold 76a, 76b. The barrel 68 of the injector 64 is heated to melt the mixture, and the rotating screw 66 propels the mixture in the direction of the nozzle 74. The screw 66 is then moved linearly frontward in direction B to impart the "shot" of the softened mixture into the mold 76a, 76b at the desired pressure.

Figure 3A:
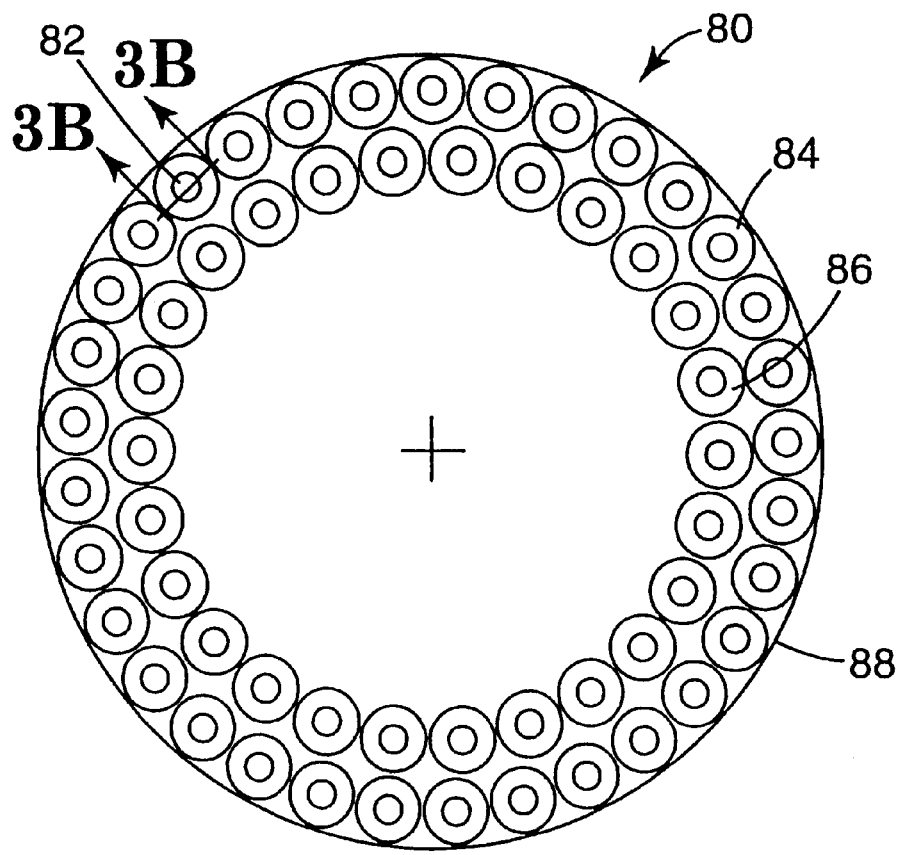
FIGS. 3A and 3B are schematic illustrations of a mold suitable for use in the method of the present invention.
Figure 4:
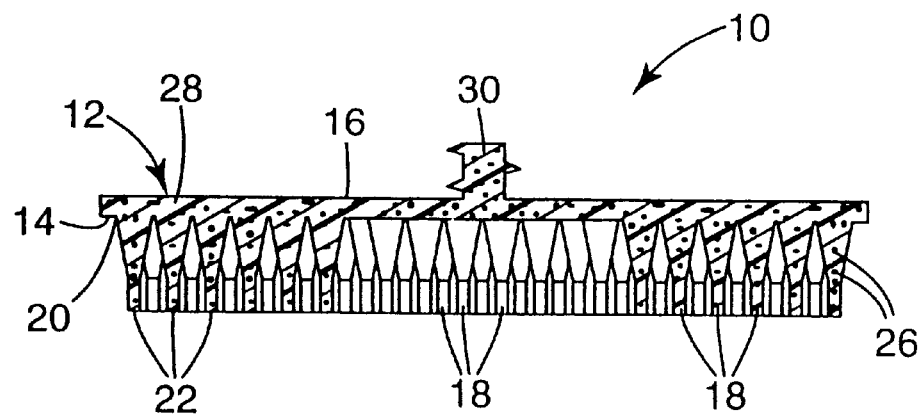
FIG. 4 is a cross sectional view of one preferred embodiment of an abrasive article made in accordance with the present invention.

In the present invention, a binder precursor matrix including at least two interactive components is delivered to a mold, as described above. An abrasive article mold typically contains cavities which are the inverse of the desired abrasive article configuration. In one preferred embodiment, a mold contains cavities which are inverse of an abrasive brush configuration, as shown in FIG. 3A. A mold design must take into account the abrasive brush configuration, as illustrated in FIG. 4 for example, including the size and configuration of base 12, the bristles 18, and the optional attachment constituent 30.

For example, one preferred mold 80, shown in FIG. 3A, includes a plurality of bristle segments 82 and base portion 88. In this embodiment, the plurality of bristle segments 82 are arranged in an outer bristle segment row 84 and an inner bristle segment row 86. In this embodiment, the outer bristle segment row 84 includes bristle segments 82 that are equally spaced at about 11.25° apart, as measured from the center point of the abrasive brush. The inner bristle segment row 86 includes segments 82 that are equally spaced at about 14.40° apart, as measured from the center point of the abrasive brush.

Figure 3B:
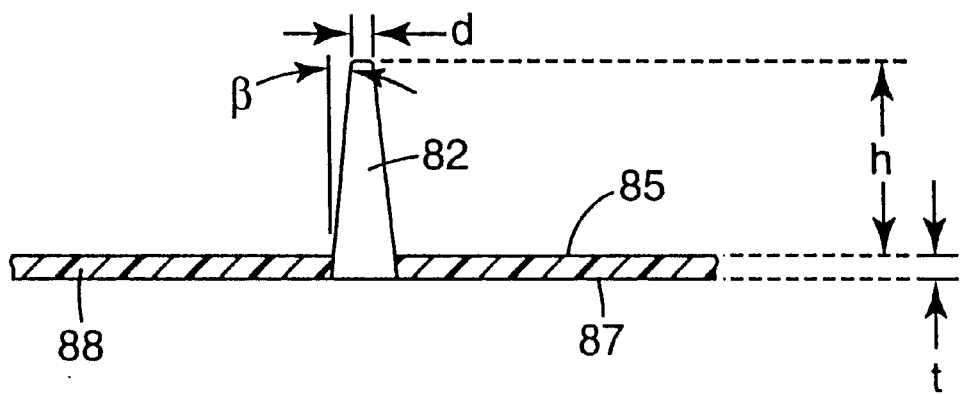

As shown in FIG. 3B, taken across line 3B—3B in FIG. 3A, a cross section of a bristle segment 82 and a portion of the base 88 (having a thickness from about 0.5 mm to about 15 mm, shown by t) are shown. The bristle segment 82 has a height of about 0.75 inches (1.9 cm), shown by h, a 0.075 inch diameter (1.9 mm) at a tip portion, shown by d, and a 5° taper at the tip, shown by angle β. Typically, the mold itself can be fabricated from a relatively noncompliant material such as aluminum, steel, brass copper, steel, rubber, and a combination thereof.

One with ordinary skill in the art will recognize that various modifications can be made to the abrasive article mold that will affect the characteristics in a finished abrasive article. For example, the number, spacing, height, and/or diameter of the bristle segments could be varied, if desired.

Abrasive Articles

Figure 5:
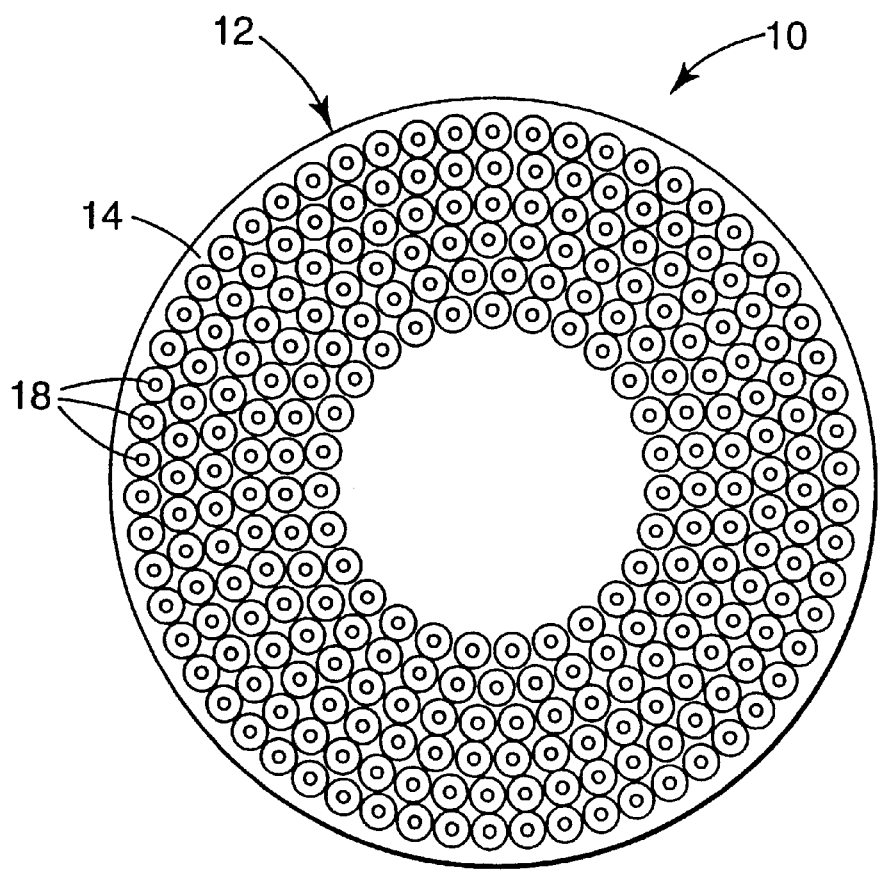
FIG. 5 is a plan view of the abrasive article of FIG. 4.

Referring to FIGS. 4 and 5, one preferred embodiment of abrasive brush 10 comprises a planar base 12 having first side 14 and second side 16. A plurality of bristles 18 project outwardly from first side 14 of base 12. In between bristles 18 are spaces in which the first side 14 of the base 12 is exposed. Abrasive brush 10 is preferably integrally molded with the bristles 18 which comprise abrasive particles 26 adhered together within a binder 28 formed from a binder precursor matrix. The base 12 preferably contains no abrasive particles, however it is within the scope of the present invention that abrasive particles may be present in the base.

The materials, manufacturing process and brush configuration will depend upon the desired refining application. As used herein, the term "refine" includes at least one of the following: remove a portion of a workpiece surface; impart a surface finish to a workpiece; descale a surface; deburr a surface; clean a workpiece surface, including removing paint or other coatings, gasket material, corrosion, oil residue, or other foreign material or debris; or some combination of the foregoing. In some applications, it may be preferred to provide aggressive abrasive characteristics, in which case the brush segment may comprise abrasive particles, larger size abrasive particles, harder abrasive particles, a higher abrasive particle to binder ratio, or some combination of the above. In other applications, it may be preferred to provide a polish type finish to the surface being refined, or to clean a surface without removing surface material itself, in which case the brush may employ no abrasive particles, smaller abrasive particles, softer abrasive particles, lower abrasive particle to binder ratio, or some combination of the above. It is possible to employ abrasive particles of varied composition and hardness to obtain the desired abrading characteristics.

Base

In a preferred embodiment, the base 12 is generally planar. However, it is within the scope of the invention to have a contoured or curved base. For example, base 12 may be convex, concave, or conical in shape. In such an arrangement, the bristles 18 may be of uniform length in which case tips 22 of the bristles will not be coplanar, or bristles may be of varying length in which case the tips may be coplanar. The base 12 may optionally contain a lip around its periphery where a portion of the base extends radially beyond the outermost bristles 18. The size of the lip is preferably minimized so that it does not interfere with maneuvering the abrasive brush 10 against surfaces bounding and at an angle relative to the surface of the workpiece.

In one embodiment, the base 12 is of a suitable material and thickness to provide a slightly flexible base 12, which helps maintain more bristles in contact with an uneven or irregular workpiece. The base 12 preferably is capable of flexing at least 1°, more preferably at least 2°, and still more preferably at least 5° without damage or substantial permanent deformation to the base. The desired degree of flexing also depends upon the intended refining application and the material of the workpiece. The base 12 can preferably have a thickness of from about 1 to 15 mm, more preferably from about 1.5 to 10 mm, still more preferably from about 2 to 6 mm, and most preferably from about 2.5 to 4 mm. Base 12 is preferably circular as illustrated in FIG. 4. The diameter of base 12 is preferably from about 2.5 to 20 cm (1 to 8 in.), although smaller and larger bases are also contemplated. Base shapes other than circular are contemplated, including, but not limited to, oval, rectangular, square, triangular, diamond, and other polygonal shapes as are relatively rigid or inflexible bases.

Preferably, the base 12 is molded integral with the bristles 18 to provide a unitary abrasive brush. Thus, no adhesive or mechanical means is required to adhere the bristles 18 to the base 12. It is preferred that the base 12 and bristles 18 are molded simultaneously. Preferably, a plurality of abrasive particles 26 are dry filled in the bristle portions of an abrasive article mold. A stream of a binder precursor matrix is then injected in the mold, as describe above in the RIM processing to fill in and around the abrasive particles already in the mold. In such an embodiment, the abrasive brush 10 comprises a relatively high concentration of abrasive particles toward tip 22 in the bristles and a substantially lower amount of abrasive particles in the base portion.

Alternatively, there may be an injection of a mixture of the binder precursor matrix 28 and abrasive particles 26. This mixture is primarily located in the bristles 18. A second injection may contain the binder precursor matrix 28 without abrasive particles 26, or with fewer abrasive particles. The binder precursor matrix 28 without abrasive particles would be present primarily in the base 12 of the abrasive brush 10. Further, there may be an initial injection of a relatively high concentration of abrasive particles followed by a second injection of a lower concentration of abrasive particles, such that there is an increased density of abrasive particles at or near the bristle tips.

It is also within the scope of this invention to have two injections or more, where some or all injections may contain abrasive particles. The first injection may have larger abrasive particles, while the second injection may have smaller and/or softer abrasive particles. With such an embodiment, during abrading, the coarse abrasive particles are used first and then the finer abrasive particles are used.

Bristles

The bristles 18 extend from the first side 14 of base 12, with root 20 adjacent the base 12 and tip 22 remote from the base 12. The bristles 18 may have any cross sectional area, including but not limited to, circular, star, half moon, quarter moon, oval, rectangular, square, triangular, diamond or polygonal. In one preferred embodiment, the bristles 18 comprise a constant circular cross section along the length of the bristle 18. In other preferred embodiments, the bristles 18 will have a non-constant or variable cross section along all or a portion of the length of the bristle.

Figure 6:
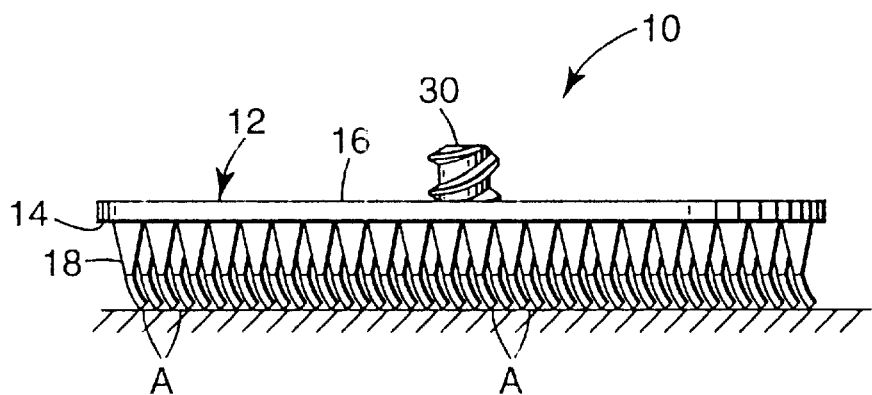
FIG. 6 is an elevational view of the abrasive article of FIG. 4 in operation.
Figure 7:
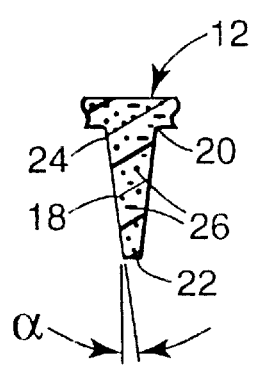
FIG. 7 is a cross sectional view of one embodiment of a bristle of the abrasive article of FIG. 4.
Figure 8:
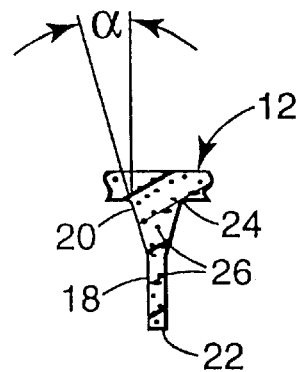
FIG. 8 is a cross sectional view of a further embodiment of a bristle of the abrasive article of FIG. 4.

It is preferred to have tapered bristles such that the cross sectional area of the bristle decreases in the direction away from base 12. Tapered bristles 18 can have any cross-section as described above, and preferably have a circular cross section. Tapered bristles 18 tend to be easier to remove from the mold during fabrication of the abrasive brush than constant cross sectional area bristles 18. Furthermore, bristles 18 are subjected to bending stresses as abrasive brush 10 is rotated against a workpiece as illustrated in FIG. 6. These bending stresses are highest at the root 20 of bristles 18. Therefore, a tapered bristle such as illustrated in FIGS. 7 and 8 is more able to resist bending stresses than a cylindrical bristle. Furthermore, brush 10 preferably includes a fillet radius 24 at the transition between the root 20 of the bristle 18 and the first surface 14 of the base. Fillet 24 can have a radius of from about 0.25 to 2.5 mm (0.010 to 0.100 in.), and more preferably from about 0.5 to 1.3 mm (0.020 to 0.050 in.). In one preferred embodiment illustrated in FIG. 7, bristles 18 are conical, having a decreasing diameter along the entire length. In another preferred embodiment illustrated in FIG. 8, bristles 18 have a tapered portion adjacent the base and a cylindrical portion for the remainder of the bristle. In one preferred embodiment, the taper extends from root 20 to approximately 80% of the length towards the tip 22, and the bristle is cylindrical for the remainder of the length to tip 22. The taper can comprise any suitable angle, and in one preferred embodiment is approximately 3° to 25° as measured at angle a in FIGS. 7 and 8.

Bristles 18 comprise an aspect ratio defined as the length of bristle 18 measured from root 20 to tip 22, divided by the width of the bristle. In the case of a tapered bristle, the width is defined as the average width along the length for purposes of determining the aspect ratio. In the case of non-circular cross section, the width is taken as the longest width in a given plane, such as the corner-to-corner diagonal of a square cross section. In one preferred embodiment illustrated in FIGS. 4–10, the aspect ratio of bristles 18 is preferably at least 1, more preferably from about 4 to 18, and still more preferably from about 6 to 16. The size of bristles 18 can be selected for the particular application of brush 10. The length of the bristles 18 is preferably from about 5 to 80 mm, more preferably from about 5 to 50 mm, still more preferably from about 5 to 25 mm, and most preferably from about 10 to 20 mm. The width of the bristles 18 is preferably from about 0.25 to 10 mm, more preferably from about 0.5 to 5 mm, still more preferably about 0.75 to 3 mm, and most preferably from about 1 to 2 mm. In one preferred embodiment, all of the bristles 18 have the same dimensions. Alternatively, bristles 18 on a single brush 10 may have different dimensions such as different lengths, widths or cross sectional areas. The lengths of the bristles 18 and contour of the base 12 are preferably chosen so that the tips 22 are generally coplanar, although other arrangements are also contemplated by the present invention.

The density and arrangement of the bristles 18 can be chosen for the particular application of abrasive brush 10. The bristles 18 may be arranged on the base 12 in a random or ordered pattern. If the base 12 is circular, it is preferred to have the bristles 18 arranged in concentric circular rings. As abrasive brush 10 is rotated to treat a workpiece, those bristles near the center of the base 12 travel at a slower linear speed than the bristles 18 near the periphery of the base 12. Therefore, bristles 18 at or near the center of the base 12 would do less work relative to the bristles 18 remote from the center. Accordingly, brush 10 may have a portion of first face 14 at the center of base 12 which does not include any bristles 18 as illustrated in FIG. 3A. The bristles 18 may .or may not abut adjacent bristles as desired. The density of bristles 18 preferably ranges from about 1 to 30 bristles/cm$^2$, and most preferably about 1 to 5 bristles/cm$^2$. The bristles may be present over only a portion of first side 14 of base 12, or substantially the entire first side 14 of base 12.

The material, length, and configuration of the bristles are preferably chosen such that bristles 18 are sufficiently flexible to aid in refining uneven or irregular workpieces. Preferably, base 12 is also slightly flexible to further aid in refining such workpieces. When flexible bristles are used, the bristle contacts the workpiece surface at the juncture of the leading edge of the tip 22 and the outermost portion of the side surface of the bristle, as illustrated at A in FIG. 6. This is in contrast to inflexible abrading protrusions having very low aspect ratios, as known in the art. Such protrusions primarily contact the workpiece with the entire planar surface at the tip of the protrusion.

In one preferred embodiment, bristles 18 are of equal length and extend from a planar base 12, resulting in the tips 22 being coplanar when the brush is at rest; It is also possible to have base 12 and bristle 18 arrangements in which the tips 22 of the bristles are not coplanar. For example, it is possible to have bristles near the periphery of the base be longer than the bristles at the center of the brush 10. This can be done to compensate for the deformation of the bristles caused by high rotational speed (as high as 22,000 RPM or more). Under such conditions, the bristles near the periphery of the base 12 travel at a higher speed than the bristles near the center of the base, and thus bend radially outwardly to a greater extent than the bristles near the center of the base. The at-rest height variation can be selected so as to achieve approximately coplanar bristle tips 22 at operating conditions.

Attachment Constituent

Referring to FIG. 4, abrasive brush 10 comprises attachment constituent 30 integral with base 12 but opposite bristles 18. The attachment constituent 30 provides a means to secure the abrasive brush 10 to a rotary tool and/or a support pad or a back up pad during use. Attachment constituent 30 maybe molded integrally with the base and bristles, although it would also be feasible to place a previously formed attachment constituent into the mold and then inject the binder precursor matrix. Preferred attachment constituent are well known in the art and are described in U.S. Pat. Nos. 3,562,968; 3,667,170; and 3,270,467. A more preferred attachment constituent is a threaded stud adapted for screw-type engagement with a rotary tool, such as that taught by U.S. Pat. No. 3,562,968. This type of attachment constituent is preferred for circular or disc shaped brush 10. It is preferred that the attachment constituent 30 be centered relative to the base 12 for proper rotation. The attachment constituent 30 may be made from the same material as the rest of the abrasive brush 10, and may contain abrasive particles 26. Alternatively, the attachment constituent 30 may be made from a separate injection of binder precursor matrix 28 without abrasive particles 26.

It is also within the scope of this invention to use a hook and loop type attachment such as that taught in U.S. Pat. No. 5,077,870 (Melbye et al.) or of the type commercially available under the trade designation of SCOTCHMATE from Minnesota Mining and Manufacturing Company, St. Paul, Minn. It is also possible to use a hermaphroditic fastener such as that commercially available under the trade designation DUAL LOCK fastener, from Minnesota Mining and Manufacturing Company, to secure the abrasive brush to a back up pad. It is also possible to employ intermeshing structured surfaces such as taught in U.S. Pat. No. 4,875,259 (Appeldorn). Alternatively, the base of the abrasive brush may contain one or more straight or threaded holes or openings so that the abrasive brush may be mechanically secured (such as with a bolt and nut) to the back up pad.

Reinforcing Constituent

Figure 9:
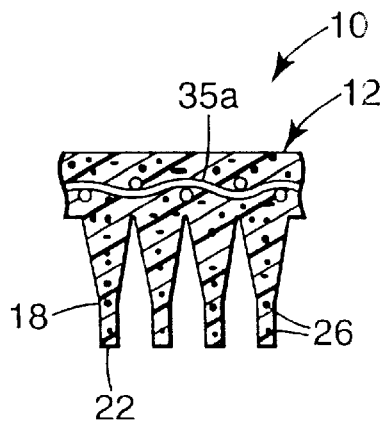
FIG. 9 is a partial cross sectional view of an alternate embodiment of an abrasive article including a reinforcing constituent according to the present invention.

The base portion may further comprise reinforcing constituent which can comprise a fiber reinforcing constituent 35a as illustrated in FIG. 9. Reinforcing constituent 35a can comprise, for example, fabric, non-woven sheeting, mesh, scrim, and the like, or can comprise individual fibers compounded into the binder precursor matrix and dispersed throughout the abrasive brush. The reinforcing constituent may optionally contain a treatment to modify its physical properties. The purpose of the reinforcing constituent is to increase the flexural strength and tensile strength of the base. Examples of reinforcing fibers suitable for use in the present invention include glass fibers, metal fibers, carbon fibers, wire mesh, mineral fibers, fibers formed of heat resistant organic materials, or fibers made from ceramic materials. Other organic fibers include polyvinyl alcohol fibers, nylon fibers, polyester fibers and phenolic fibers. If glass fibers are used, the moldable polymer mixture may preferably contain a coupling agent, such as a silane coupling agent, to improve the adhesion to the binder precursor matrix material. The length of the fiber will range from about 0.5 mm to about 50 mm, preferably about 1 mm to about 25 mm, most preferably about 1.5 mm to about 10 mm. The fiber denier will be between about 25 to 300, preferably between 50 to 200.

Figure 10:
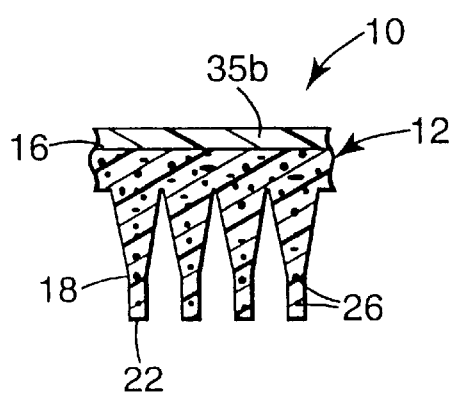
FIG. 10 is a partial cross sectional view of an alternate embodiment of an abrasive article including an alternate reinforcing constituent according to the present invention.

The reinforcing constituent may comprise a reinforcing layer or substrate 35b as illustrated in FIG. 10. Abrasive brush 10 comprises base 12 having attached to it on second side 16 a reinforcing substrate 35b. The purpose of the reinforcing substrate 35b is to increase the strength of the base 12. The reinforcing substrate 35b can be free of abrasive particles 26. The reinforcing substrate can comprise a binder precursor matrix. In this case, the reinforcing substrate can be molded at the same time as the abrasive brush 10. Alternatively, the reinforcing substrate 35b can be a backing type material such as a polymeric film, primed polymeric film, cloth, paper, vulcanized fiber, nonwoven layer, and treated versions thereof. In this case, the reinforcing substrate 35b can be inserted into the mold and the binder precursor matrix 28 forming the brush 10 can bond to the reinforcing substrate 35b. Alternatively, the reinforcing substrate 35b can be adhesively bonded to the brush 10 after the brush is molded. In one preferred embodiment, the reinforcing substrate 35b is coextensive with the base 12, although it may be smaller or larger as desired.

Figure 11:
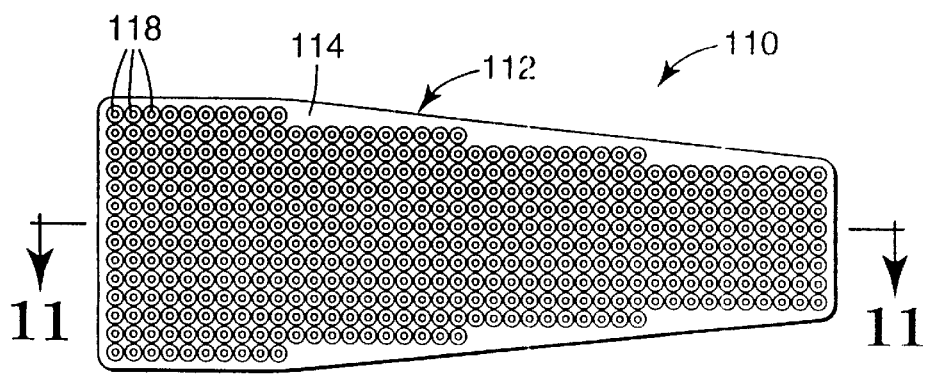
FIG. 11 is a plan view of an alternate embodiment of an abrasive article made in accordance with the present invention.
Figure 12:
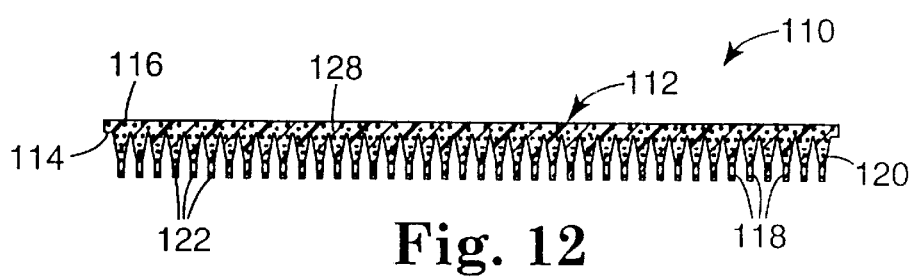
FIG. 12 is a cross-sectional view of the abrasive article in FIG. 11 taken across plane 11—11.

Referring now to FIGS. 11 and 12, there is seen an alternate embodiment of molded abrasive brush 110 according to the present invention. Abrasive brush 110 comprises planar base 112 which is a generally wedge-shaped polygon as shown. Base 112 has first side 114 and second side 116 opposite one another. Extending from first side 114 are a plurality of bristles 118. Bristles 118 may be tapered to have root 120 wider than tip 122 for all or a portion of the length of bristles 118 as described above with respect to the embodiment of FIGS. 4 and 5.

Figure 13:
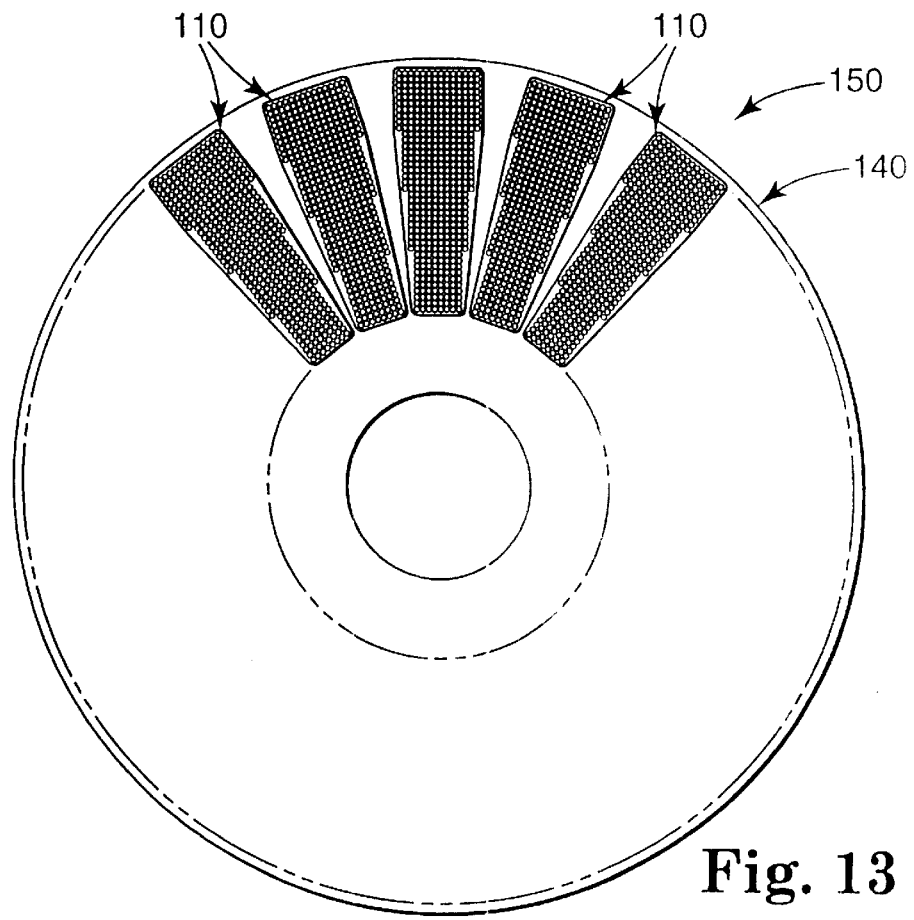
FIG. 13 is a plan view of a brush assembly according to the present invention having a plurality of abrasive brushes mounted on a backing.

While abrasive brush 110 is configured for convenient use with rotary floor machines commonly used in floor maintenance procedures, its utility is not thereby limited. As seen in FIG. 13, a plurality of abrasive brushes 110 may be mounted on a suitable backing 140 to form assembly 150. Backing 140 may be attached to rotary floor machines or flat part deburring machines as are known in the art for refining a floor surface or refining metal surfaces.

Figure 14:
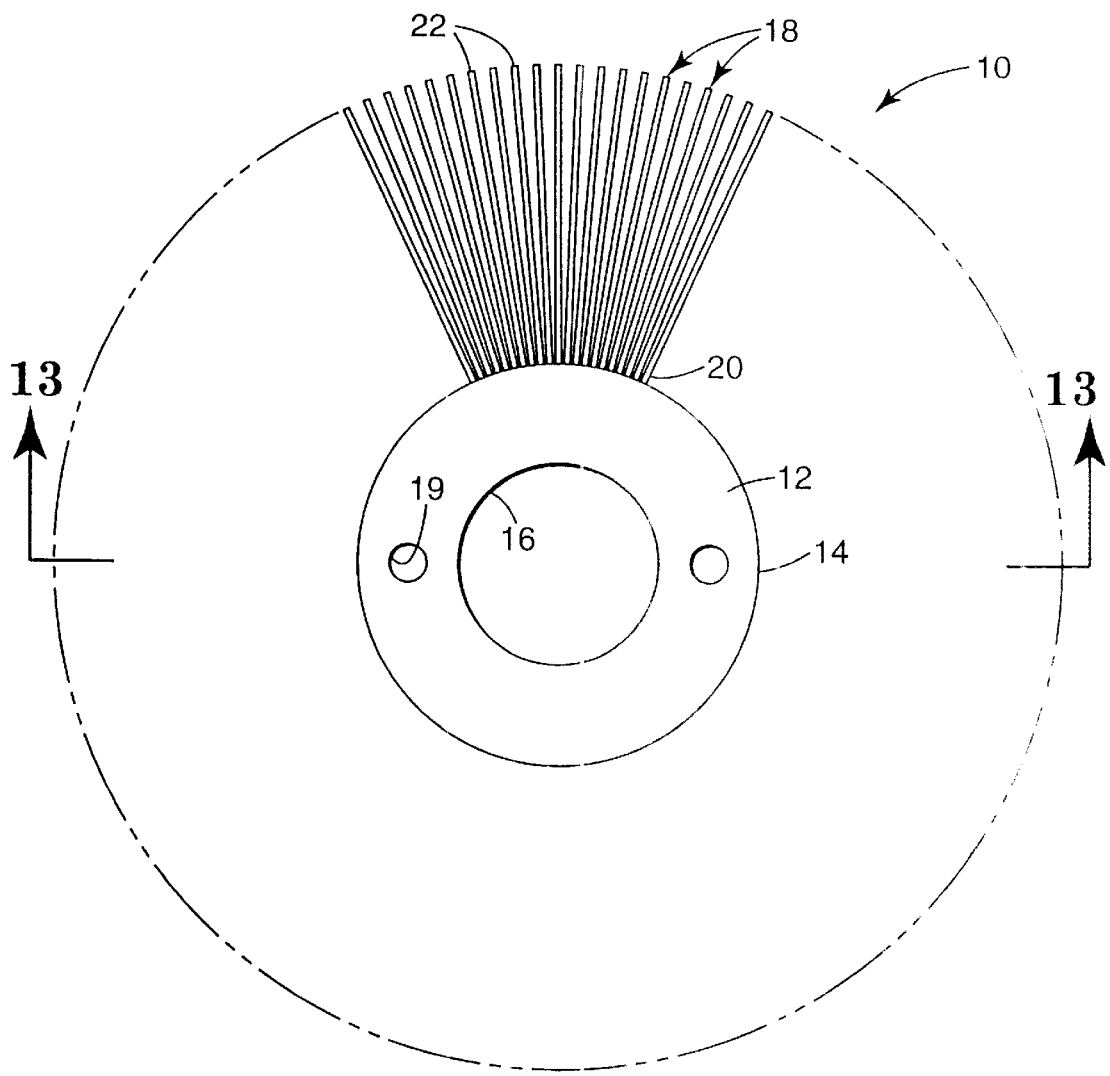
FIG. 14 is a plan view of a first embodiment of a radial abrasive brush segment according to the present invention.
Figure 15:
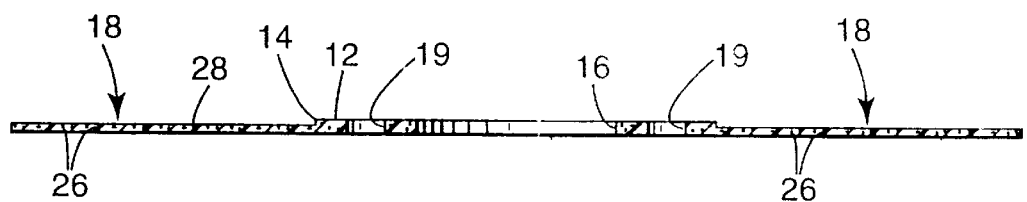
FIG. 15 is a cross sectional view of the brush segment of FIG. 14, taken along line 13—13.

Referring to FIGS. 14 and 15, there is seen yet a further alternate embodiment of a molded abrasive brush according to the present invention. The terms "abrasive brush" and "abrasive brush segment" will be used interchangeably to refer to this embodiment. As illustrated in FIGS. 14 and 15, abrasive brush segment 10 comprises a base or center portion 12 having outer edge 14 and inner edge 16. A plurality of bristles 18 project outwardly from outer edge 14, beginning at bristle roots 20 and ending at bristle tips 22. There may be spaces between bristle roots 20 in which outer edge 14 of base or center portion 12 is exposed. Alternatively, adjacent bristles may adjoin one another at roots 20. Brush segment 10 is integrally molded such that bristles 18 and center portion 12 are continuous with one another. Brush segment 10 is preferably an abrasive brush segment which comprises a generally homogenous composition of abrasive particles 26 in a binder precursor matrix 28.

Figure 16A:
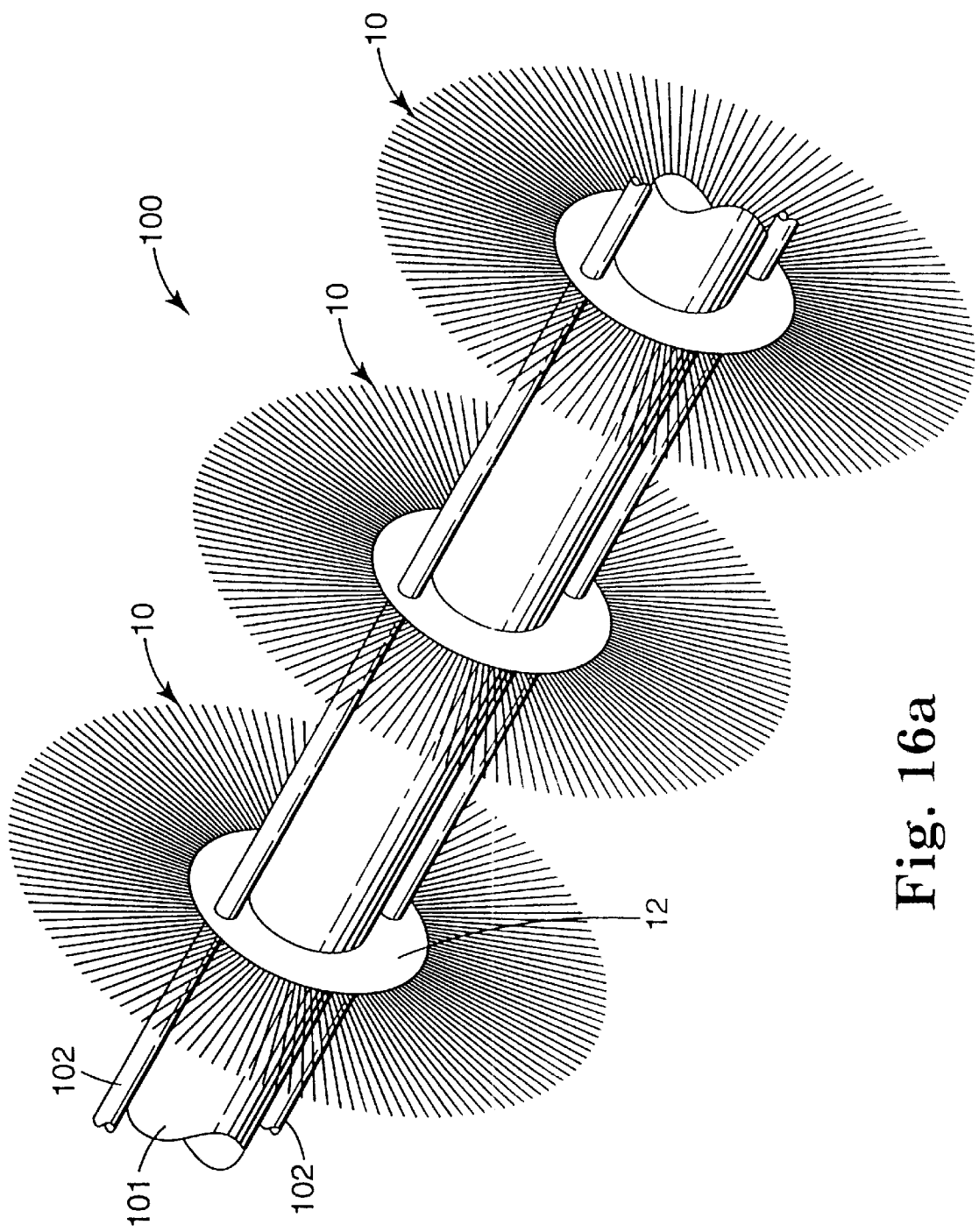
FIG. 16a is an isometric view of a plurality of brush segments of FIG. 14 being assembled onto a shaft to form a brush assembly.
Figure 16B:
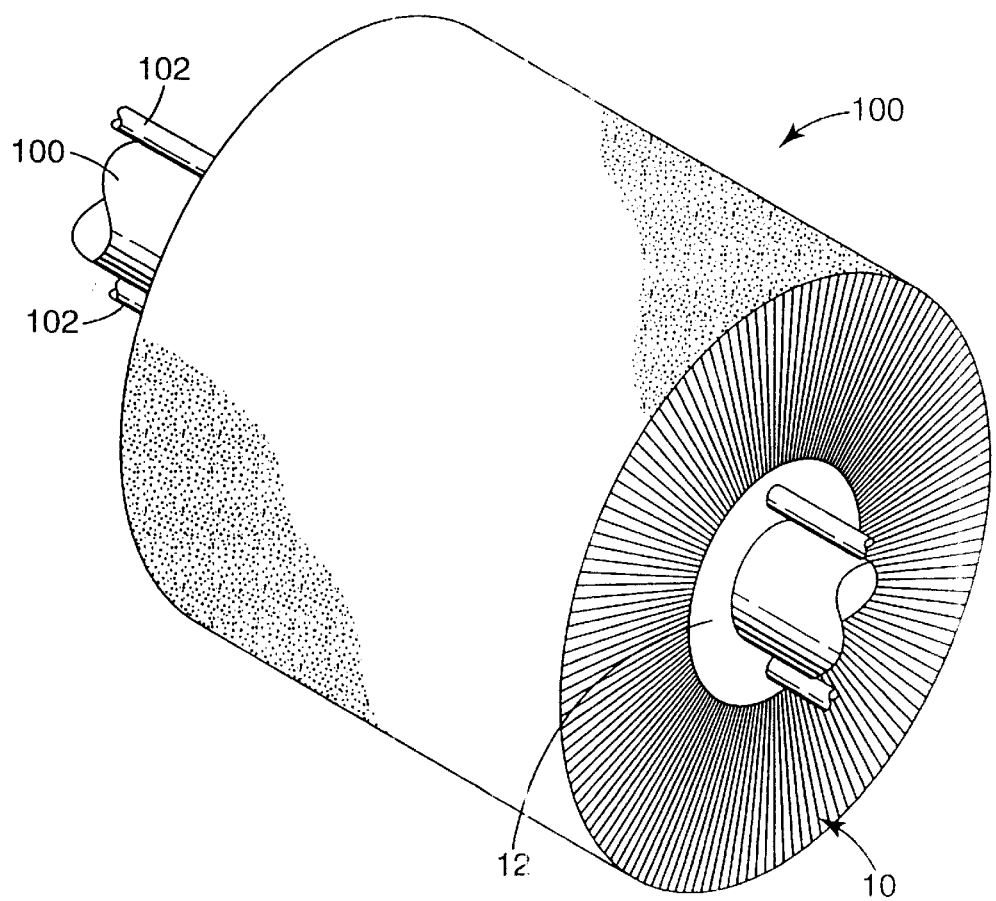
FIG. 16b is a view like FIG. 16a, with the individual brush segments adjoining one another.

As illustrated in FIG. 16a, a plurality of brush segments 10 can be assembled onto main shaft 101 to form a brush assembly 100. Any number of segments 10 may be assembled together to provide an assembly 100 of any desired width. Preferably, the brush segments 10 are adjacent one another such that there is essentially no space between the brush segments, as illustrated in FIG. 16b. Alternatively, the brush segments 10 may be assembled onto to shaft 101 so as to have space between adjacent brush segments as illustrated in FIG. 16a. For example, there may be 5 to 10,000 brush segments 10 assembled together to form assembly 100, although more or less may be used as desired. A constituent for providing segment-to-segment engagement may be included to reduce or eliminate rotation of adjacent brush segments relative to one another. Such engagement constituent can include, for example, an interengaging saw tooth pattern or hole and dimple pattern on the surfaces of center portion 12. For convenience, this embodiment may be referred to as a "brush segment" when it is intended to be combined with other segments into a brush assembly. However, it is understood that the term "brush segment" is not intended to exclude embodiments which are used themselves without being combined with other brush segments, and the term "brush" may also be used to refer to a brush segment.

Center Portion

Figure 17:
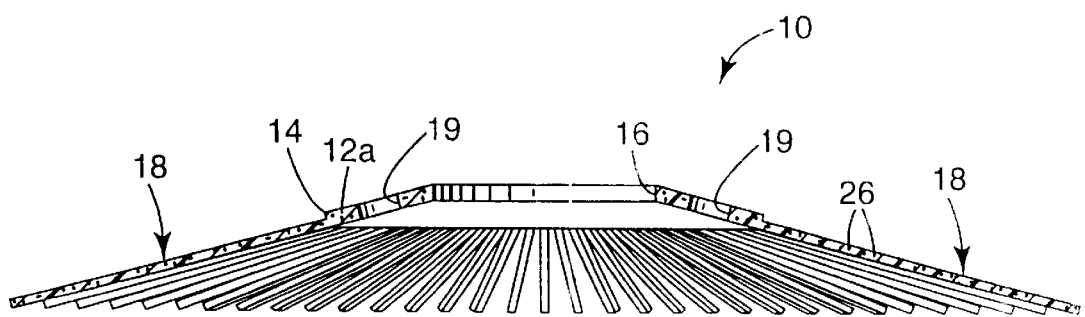
FIG. 17 is a cross sectional view of a second embodiment of a radial abrasive brush segment according to the present invention.

The term "center portion" is generally used for convenience with respect to embodiments of brushes having the bristles extending generally radially outward as illustrated in FIGS. 14–19. The term "base" is generally used for convenience with respect to embodiments of brushes having bristles extending generally perpendicular to the base as illustrated in FIGS. 4–13. However, it is understood that the terms "base" and "center portion" are not thereby limited, and may be used interchangeably throughout. In the embodiment illustrated in FIG. 14, center portion or base 12 is a continuous circumferential portion which is generally planar. It is also within the scope of the invention to have a contoured or curved center portion. For example, center portion 12 may be convex, concave, or conical in shape. As illustrated in FIG. 17, center portion 12a is conical, with the bristles 18 extending parallel to the conical surface defined by the center portion.

Brush segment 10 may optionally have an attachment constituent on center portion 12, such as a channel, keyway, or a root to mechanically join several brush segments together on a drive constituent to provide a brush assembly. As illustrated in FIG. 14, center portion 12 includes two mounting holes 19, through which a locking rod may be inserted. A brush assembly 100, having two locking rods 102 inserted through holes 19 is illustrated in FIG. 16a. Shaft 101 and locking rods 102 may then be attached to a suitable rotary drive constituent.

In the embodiments illustrated in FIGS. 14–19, center portion 12 can preferably have a thickness of from about 0.5 to 25 mm, more preferably from about 1 to 10 mm, still more preferably from about 1.5 to 6 mm, and most preferably from about 1.5 to 3 mm. Center portion 12 is preferably circular as illustrated in FIG. 14. The diameter of the outer edge 14 of center portion 12 is preferably from about 2.5 to 61 cm (1 to 24 in.), although smaller and larger center portions are also within the scope of the invention. In one preferred embodiment, the center portion 12 is of a suitable material and thickness to provide a flexible center portion 12, which helps maintain more bristles in contact with an uneven or irregular workpiece. The center portion 12 preferably is capable of flexing at least 10°, more preferably at least 20°, and still more preferably at least 45° without damage or substantial permanent deformation to the center portion. Center portion shapes other than circular are also within the scope of the invention, including, but not limited to, oval, rectangular, square, triangular, diamond, and other polygonal shapes, as are relatively rigid or inflexible center portions.

Figure 18:
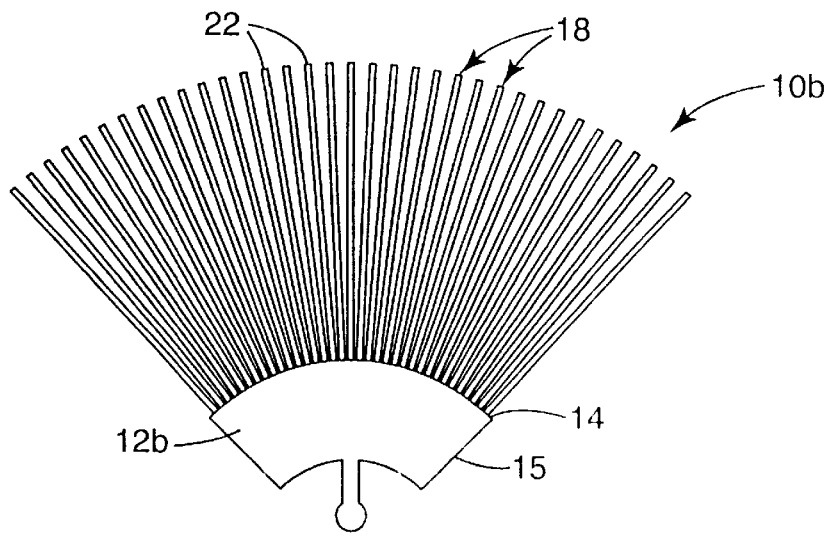
FIG. 18 is a plan view of a third embodiment of a radial abrasive brush segment according to the present invention.
Figure 19:
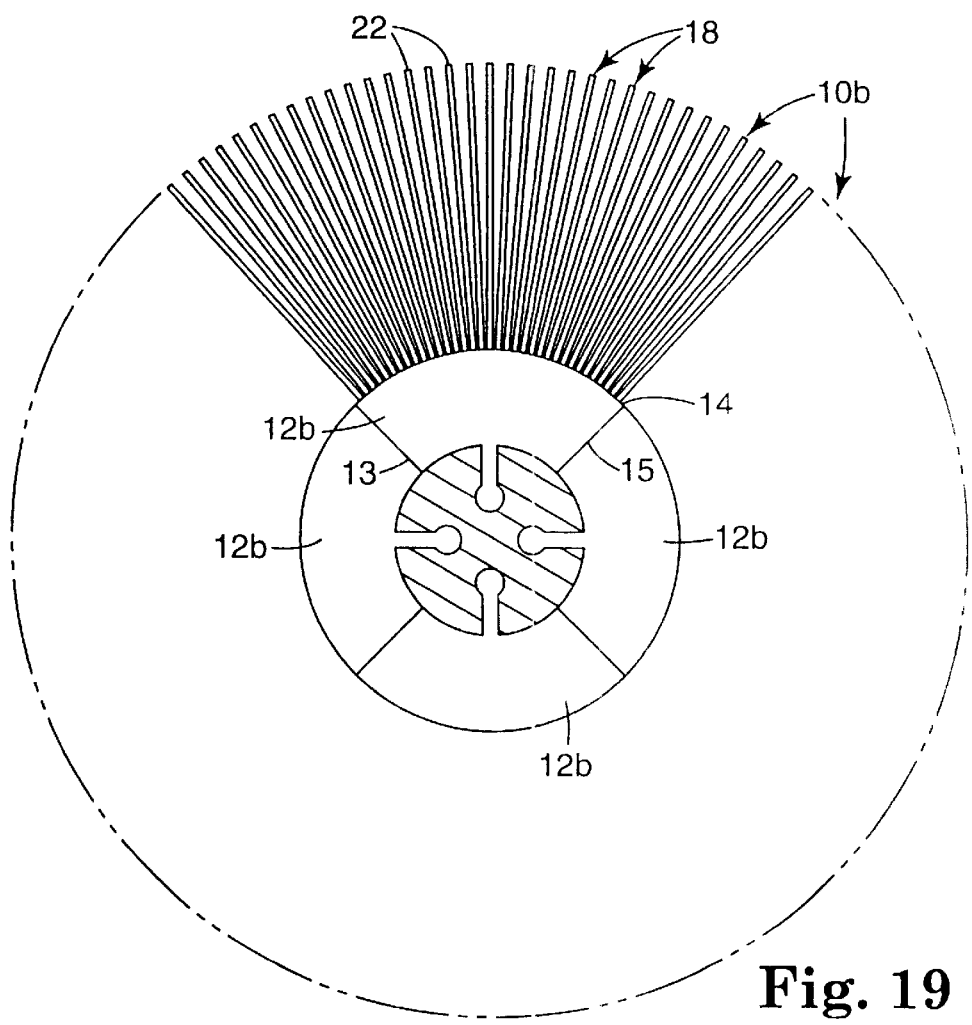
FIG. 19 is an end view of a plurality of brush segments of FIG. 18 assembled together on a shaft.

Center portion 12b may alternately be a ring section as illustrated in FIG. 18. In this embodiment, center portion 12b is bounded on each side by radial edges 13 and 15. Preferably, the ring section is of an angular width that allows for an integer number of ring sections to be assembled into a circumferential brush segment. For example, four 90° ring sections 10b are readily arranged to make a 360° circumferential brush segment as illustrated in FIG. 19.

Preferably, center portion 12 is molded integrally with the bristles 18 to provide a unitary brush segment. Thus, no adhesive or mechanical means is required to adhere bristles 18 to center portion 12. It is preferred that center portion 12 and bristles 18 are molded simultaneously. To make an abrasive brush segment, there may be a single mixture of abrasive particles 26 and binder precursor matrix 28 placed in the mold in a single injection process. In such an embodiment, the abrasive brush segment comprises a generally homogenous composition throughout. However, due to the molding process, the abrasive particle/binder mix may not be perfectly homogeneous. For example, as the polymer and abrasive mix is injected into the mold, the narrow bristle cavities may cause more polymer to initially cool adjacent the inside of the bristle cavity near the base, forcing a mix having a somewhat higher concentration of abrasive particles toward tip 22 of the bristle.

Alternatively, there may be two or more injections of a binder precursor matrix 28 to the mold. For example, one injection may contain a mixture of binder precursor matrix 28 and abrasive particles 26, located primarily in bristles 18. A second injection may contain binder precursor matrix 28 without abrasive particles 26, or with fewer or a different type of abrasive particles, located primarily in center portion 12 of brush segment 10b. It is also within the scope of this invention to have two injections, both containing abrasive particles. The first injection may have abrasive particles of a certain size, material, and/or hardness, while the second injection may include different abrasive particles. During abrading, the abrasive particles nearer tip 22 are used first, and then the abrasive particles nearer root 20 are used.

Binder Precursor Matrix

An abrasive article in accordance with the present invention includes a binder formed from a binder precursor matrix comprising at least two interactive components. Preferably, the binder precursor matrix is capable of forming a binder selected from the group consisting of a polyurethane/urea binder and an epoxy binder.

In one embodiment, the binder precursor matrix preferably includes at least two interactive components to form a polyurethane/urea binder comprising a first component selected from the group consisting of an amine, a polyol, or an amine/polyol mixture having an average amine and/or hydroxy functionality of at least about 2 and an equivalent weight of at least about 30 grams per equivalent and not to exceed about 10,000 grams per equivalent, and a second component comprising a polyfunctional isocyanate having an average isocyanate functionality of at least 2 and an equivalent weight of at least about 80 grams per equivalent and not to exceed about 5000 grams per equivalent. The components are preferably capable of, upon polymerization, forming a soft segment and a hard segment with a soft segment to hard segment ratio of about 10:1 to 1:2, preferably from about 2:1 to about 0.75 to 1.

As used herein, "soft segment" means a soft, flexible polymeric segment of the polyurea or polyurethane/urea which results from the polymerization of a macrodiol or macrodiamine having functionality of at least 2 and an equivalent weight of at least about 300. Additionally, the soft segment can be formed from a polyfunctional isocyanate prepolymer having functionality of at least 2 and an equivalent weight of at least about 300.

The term "hard segment" means a harder, less flexible polymer segment which results from polymerization of the functional isocyanate or functional amine or polyol having a functionality of at least about 2.

"Isocyanate prepolymer" means a macropolyol with functionality that has been modified to result in an isocyanate-terminated molecule.

"Chain extender" means low molecular weight monomers having active hydrogen functionality, where "active hydrogen functionality" is used in its conventional sense to principally refer to the reactive hydroxy or amine groups present in the molecule. The individual soft segments associate to form soft regions in the binder while individual hard segments associate to form hard regions in the binder.

As used herein, the term "percent abrasive article wear" means the weight loss of an abrasive article or composition during a given time while abrading a workpiece divided by the original weight of the abrasive article, multiplied by 100 to give a percent abrasive article wear; the term "efficiency" as that term relates to wear-resistance of the abrasive articles means the cut or weight loss of the workpiece being abraded divided by the percent abrasive article wear.

The following terms describe backing materials useful in making articles with the compositions described herein applied to the backing:

"Rigid polymer" means a thermoplastic or thermosetting polymer which, when fabricated for use as a backing material, exhibits sufficient stiffness so that when in use, there is substantially no deflection or distortion of its original shape. The stiffness may be imparted, for example, by adjusting the backing thickness for a given polymer selection or by the addition of reinforcing agents. Examples include nylon 6, nylon 6,6, polypropylene, filled polypropylene, polyesters, filled epoxy resins, resole phenolic resins, novolac phenolic resins, polyetherimides, polyphenylene sulfide, and others;

"Flexible polymer" means a thermoplastic or thermosetting polymer which, when fabricated for use as a backing material, exhibits substantial conformability to the surface of the workpiece. Examples include natural and synthetic rubbers, thermoplastic elastomers, polyurethanes, polyester elastomers, olefinic elastomers, and thinner backings of polymers normally considered to be rigid;

"Composite" means a fiber- or fabric-reinforced polymeric material comprising 1) a fiber and/or fabric component, and 2) a thermoplastic or thermosetting polymeric matrix. Such materials used as backings for this invention may be rigid or flexible. Examples include cotton fabric-reinforced phenolic materials and glass fiber reinforced polyester materials, such as disclosed in U.S. Pat. No. 5,316,812 (Stout et al.); and "Fabric" means a textile material made from fibers and/or yarns by weaving or knitting, or by nonwoven fabric forming techniques such as stitchbonding, air-laying, carding, spun bonding, melt blowing, wet-laying, or other known fabric-forming techniques.

Suitable binder precursor matrices for use in the abrasive articles of the present invention are comprised of a polymer including soft and hard regions as described, having a soft segment to hard segment ratio of about 10:1 to about 0.5:1, preferably about 2:1 to about 0.75:1. In other words, a polymer includes from about 90% to about 33%, preferably, from about 66% to about 42% soft segments and from about 10% to about 66%, preferably from about 33% to about 58% hard segments.

Suitable polyols include 1,2-ethane diol, 1,4-butanediol, 1,6-hexanediol, bis-(2-hydroxyethyl)-hydroquinone, diethylene glycol, and triethylene glycol, polyoxyethylene polyols, polyoxypropylene polyols, polytetramethylene oxide polyols and polyester polyols.

Suitable amines include 1,2-ethane diamine, 1,4-butanediamine, 1,6-hexanediamine, aminoethylpiperazine, bisaminopropylpiperazine, triethyleneglycoldiamine, JEFFAMINE EDR-148, JEFFAMINE D-230, JEFFAMINE D-400, and JEFFAMINE ED-600, available the Huntsman Corporation, Houston, Tex.) diethyltolylene diamine (commercially available under the trade designation ETHACURE 100, from Albemarle Corporation, Baton Rouge, La., USA), 2,4- and 2,6-isomers of 3,5-dimethylthiotoluenediamine (commercially available under the trade designation ETHACURE 300, Albemarle Corporation, Baton Rouge, La., USA) and aromatic diamines having equivalent weights of about 250 to 2000, commercially available under the trade designation VERSALINK, from Air Products Corporation, Allentown, Pa.

One type of aromatic polyamine useful in the present invention has the formula:

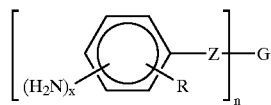

wherein n is an integer from about 2 to 4; each x is 1 or 2; each phenyl nucleus is para-amino, meta-amino, or dimeta-amino substituted; each Z is

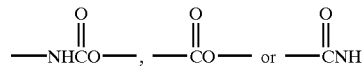

each R is hydrogen or lower alkyl having about 4 carbon atoms or less; and G is an n-valent radical which may be obtained by the removal of hydroxyl or amino groups, respectively, from an n-valent polyol or polyamine having an equivalent weight ranging from about 300 to about 3000. Examples of suitable aromatic polyamines include those commercially available from Air Products and Chemicals, Inc. under the trade names VERSALINK 650, VERSALINK 1000, VERSALINK 1000G, VERSALINK 2000 and VERSALINK 2900. The numbering of the different aromatic polyamines designated as VERSALINK indicates the approximate molecular weight, with one half of the number indicating the approximate equivalent weight. Another suitable polyfunctional amine is bis(3-amino propyl) polytetrahydrofuran. Preparation of aromatic polyamines useful in the invention is described in detail in U.S. Pat. No. 4,328,322. Preferably, the aromatic polyamines have an equivalent weight of at least about 300, and more preferably at least about 400.

The aromatic polyamines are of two classes: aminobenzoic acid esters or amides where Z is

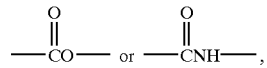

and aminophenyl urethanes where Z is

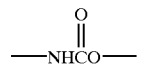

Preferably, the oligomeric aromatic polyamine is a substantially difunctional amino benzoic acid-terminated oligomer with a poly(di, tri-, tetra-, penta-, or hexa-)methylene ether backbones, having equivalent weights ranging from about 300 to about 3000, or combinations thereof Polytetramethylene ether backbone compositions are particularly preferable.

When employing oligomeric aromatic polyamines as the soft segment, the hard segments are preferably polyfunctional isocyanates having an average isocyanate functionality ranging from about 2 to about 4. The polyfunctional isocyanates may be aliphatic, cycloaliphatic, arylaliphatic, aromatic, heterocyclic or mixtures thereof The polyfunctional isocyanates preferably are aromatic or aliphatic polyisocyanates having an average isocyanate functionality of at least about 2 and more preferably are aromatic polyisocyanates with an isocyanate functionality ranging from about 2 to about 4, more preferably from about 2 to about 2.5. The polyfunctional isocyanate should be present in an amount sufficient to react with substantially all of the active hydrogen atoms in the polymerizable mixture. The ratio of the active hydrogen atoms of the polyfunctional amines to isocyanate groups of the polyisocyanate should range from about 0.8 to about 1.2, more preferably from about 0.9 to about 1.1.

Exemplary polyfunctional isocyanates meeting the above requirements of hard segments when polymerized include the polyisocyanate terminated reaction product of poly (tetramethylene glycol) polymer and an aromatic or aliphatic isocyanate having an isocyanate functionality of at least about 2, or the reaction product of a dihydroxy terminated polyester such as poly(hexamethylene adipate) and an aromatic or aliphatic isocyanate having an isocyanate functionality of at least about 2. Particularly preferable polyfunctional isocyanates include 1,6-hexamethylene diisocyanate, 1,4-cyclohexane diisocyanate, toluene diisocyanate, p-phenyl diisocyanate, diphenylmethane diisocyanate, naphthalene-1,5-diisocyanate, polymeric isocyanates, or mixtures thereof.

Alternatively, soft segments may also be made from polymerized polyfunctional isocyanate prepolymers, and examples of suitable polyfunctional isocyanate prepolymers useful as soft segments when polymerized include the polyisocyanate terminated reaction product of poly (tetramethylene glycol) polymer and an aromatic or aliphatic isocyanate having an isocyanate functionality of at least about 2, more preferably ranging from about 2 to about 5, or the polyisocyanate terminated reaction product of a dihydroxy terminated polyester such as poly(hexamethylene adipate) and an aromatic or aliphatic isocyanate having an isocyanate functionality of at least about 2, more preferably ranging from about 2 to about 5.

Examples of commercially available polyfunctional unblocked isocyanate prepolymers include ADIPRENE L-315, ADIPRENE L-167 and ADIPRENE L-100, from Uniroyal Chemical Co., Inc.

When the soft segments are made from polymerized polyfunctional isocyanate prepolymers as just described, the hard segments are comprised of the polymerization of polyfunctional polyols and/or some amines. Suitable polyfunctional amines capable of forming hard segments upon polymerization with isocyanates include aromatic, alkyl-aromatic, or alkyl polyfunctional amines, preferably primary amines. Suitable examples include isomers of diethyl-tolylene diamine, 2,4-and 2,6-isomers of 3,5-dimethylthiotoluenediamine, methylene dianitlne (MDA), 3,3'-dichloromethylene dianiline (MOCA), 3,3'-diethylmethylene dianiline and, Caytur 21(Uniroyal Chemical Corporation, Middlebury, Conn., USA), polymeric methylene dianilines having a functionality preferably ranging from about 2.1 to about 4 which includes that commercially available under the trade designation CURITHANE 103, from the Dow Chemical Company, and MDA-85, from Bayer Corporation. CURITHANE 103 has an average amine functionality of about 2.3 and is composed of 65% 4,4'-methylene dianiline, 5% 2,4'-methylene dianiline, and 30% polymeric methylene dianiline. MDA-85 contains about 85% 4,4'-methylene dianiline and 15% polymeric methylene dianiline and amine functionality of about 2.2. Examples of suitable alkyl amines include 1,5-diamine-2-methyl pentane, and tris(2-aminoethyl) amine.

Another suitable binder precursor matrix includes at least two interactive components to form an epoxy binder: a first component comprising a curable glycidyl ether epoxide group containing material, and a second component comprising an amino-terminated aliphatic polyether curing agent. As used herein, "amino-terminated aliphatic polyether curing agent" means an organic material having two or more aliphatic backbone units, two or more ether backbone units, and two or more terminal amino groups bearing one or more active hydrogen atoms.

Preferably, the first component is a glycidyl ether derivative having an oxirane ring polymerizable by ring opening. Such materials are generally referred to as glycidyl ether epoxides and include monomeric epoxy compounds and epoxides of the polymeric type. Such epoxides are well know and include such epoxides as glycidyl ether type epoxy resins and the diglycidyl ethers of bisphenol A and of novolak resins. An epoxide group containing material useful in the present invention includes glycidyl ether monomers of the formula:

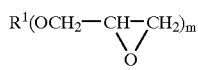

where $R^1$ is alkyl or aryl and m is an integer of 1 to 6. Examples are the glycidyl ethers of polyhydric phenols obtained by reacting a polyhydric phenol with an excess of chlorohydrin such as epichlorohydrin.

Preferably, the second component comprises a polyether diamine having the general formula

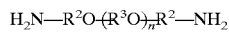

wherein $R^2$ is a straight or branched chain alkylene group having 2 to 4 carbon atoms, $R^3$ is an hydrocarbolene group having 2 to 8 carbon atoms selected from straight and branched chain alkylene groups having 2 to 4 carbon atoms, cycloalkylene groups having 4 to 8 carbon atoms, and arene groups having 6 to 8 carbon atoms, and n is an integer from 1 to 10 such that the average molecular weight of the compound is from about 175 to about 750, preferably from about 175 to about 500.

Optionally, the binder precursor matrix may include a polymeric toughening agent having both a rubbery phase and a thermoplastic phase or being capable of forming, with the epoxide group containing material, both a rubbery phase and a thermoplastic phase on curing to prevent cracking of the cured epoxy binder. The binder precursor may also contain a catalyst that is preferably capable of providing an exotherm of at least 20° C., when the catalyst binds with the epoxide group containing material and the amino-terminated aliphatic polyether. Such catalysts are typically a metal salt, preferably selected from the group consisting of calcium nitrate, strontium nitrate, and a metal salt including calcium, strontium, or barium cations and perchlorate or trifluoromethane sulfonate anions. A suitable example of a binder precursor matrix forming an epoxy binder is described in U.S. Pat. No. 4,668,736 (Robins et al.).

Chain Extenders

Where the binder precursor matrix forms a polyurea binder made from oligomeric aromatic polyamine soft segments and polyfunctional isocyanate hard segments, chain extenders may optionally be added to the binder precursor matrix. Chain extenders preferably have an active hydrogen functionality from about 2 to 8, preferably from about 2 to 4, and more preferably from about 2 to 3, and an equivalent weight less than about 300, preferably less than about 200. Well suited chain extenders are low molecular weight polyfunctional amines including aromatic; alkyl-aromatic, or alkyl polyfunctional amines, preferably primary amines. Examples of low molecular weight polyfunctional aromatic amines include methylene dianiline ("MDA"), polymeric methylene dianilines having a functionality of 2.1 to 4 which include the dianiline CURITHANE 103, commercially available from Dow Chemical Company, and the dianiline MDA-85, from Bayer Corporation. The dianiline CURITHANE 103 has an average amine functionality of about 2.3 and is composed of 65% 4,4'-methylene dianiline, 5% 2,4'-methylene dianiline, and 30% polymeric methylene dianiline. The dianiline MDA-85 contains about 85% 4,4'-methylene dianiline and 15% polymeric methylene dianiline and amine functionality of about 2.2.

Examples of other suitable amine chain extenders include ethylene diamine, 1,5-diamine-2-methyl pentane, and tris(2-aminoethyl) amine. Other suitable chain extenders include trimethylolpropane monoalkyl ether, ethanolamine, diethanolamine, methylene dianiline, diethyl toluene diamine, 2-methylpentamethylenediamine, para-phenylene diamine, ethylene glycol, propylene glycol (1,2 and 1,3), butylene glycol (1,4 and 2,3), 1,4 butenediol, 1,4 butanediol, various hydroxy substitutions of pentanediol, hexanediol and octanediol, trimethylolpropane, or mixtures thereof.

Abrasive Particles

Abrasive particles useful in the invention can be of any conventional grade utilized in the formation of abrasive articles. The abrasive particles 26, as shown in FIG. 4 for example, useful in the brushes and brush segments described herein typically have a particle size ranging from about 0.1 to 1500 micrometers, usually between about 1 to 1300 micrometers, and preferably between 50 and 500 micrometers. The abrasive particles may be organic or inorganic. Examples of inorganic abrasive particles include fused aluminum oxide, heat treated fused aluminum oxide, ceramic aluminum oxide, heated treated aluminum oxide, silicon carbide, titanium diboride, alumina zirconia, diamond, boron carbide, ceria, cubic boron nitride, garnet, and combinations thereof. Preferred fused aluminum oxide include those available commercially pretreated by Exolon ESK Company, Tonawanda, N.Y., or Washington Mills Electro Minerals Corp., North Grafton, Mass. Preferred ceramic aluminum oxide abrasive particles are well known in the art and include those described in U.S. Pat. Nos. 4,314,827; 4,623,364; 4,744,802; 4,770,671; 4,881,951; 4,964,883; 5,011,508; and 5,164,348. Preferred alpha alumina-based ceramic abrasive particles comprising alpha alumina and rare earth oxide include those commercially available under the designation 321 Cubitron abrasive grain from Minnesota Mining and Manufacturing Company, Saint Paul, Minn. Other examples of abrasive particles include solid glass spheres, hollow glass spheres, calcium carbonate, polymeric bubbles, silicates, aluminum trihydrate, and mullite. The abrasive particles can be any particulate material (inorganic or organic) that when combined with the binder results in an abrasive brush 10 that can refine a workpiece surface. The selection of the abrasive particles will depend in part on the intended application. For example, for stripping paints from a vehicle, it is sometimes preferred to use a relatively soft abrasive particle so as not to damage the surface underneath the paint. Alternatively, for removing burs from metal workpieces, it is preferred to use a harder abrasive particle such as alumina. The abrasive brush of the present invention may include two or more types and/or sizes of abrasive particles.

As used herein, the term abrasive particles also encompasses single abrasive particles which are bonded together to form an abrasive agglomerate. Abrasive agglomerates may be particularly useful when it is desirable to incorporate a plurality of fine abrasive particles into an abrasive article in accordance with the present invention. Fine abrasive particles typically have a size of about 100 grit or finer and tend to "block" the flow of the binder precursor into the abrasive article mold thus, preventing abrasive particles from adhering to one another once the binder precursor matrix has cured. Abrasive agglomerates are well known in the art and are further described in U.S. Pat. Nos. 4,311,489; 4,652,275; and 4,799,939. The abrasive particles of this invention may also contain a surface coating. Surface coatings are known to improve the adhesion between the abrasive particle and the binder in the abrasive article. Such surface coatings are well known in the art and are described in U.S. Pat. Nos. 5,011,508; 1,910,444; 3,041,156; 5,009,675; 4,997,461; 5,213,591; and 5,042,991. In some instances, the addition of the coating improves the abrading and/or processing characteristics of the abrasive particle.

Organic abrasive particles, also referred to as plastic abrasive particles, are useful in the brushes and brush segments of the present invention. These particles are preferably formed from either a thermoplastic polymer and/or a thermosetting polymer and may be individual particles or agglomerates of individual particles. The agglomerates may comprise a plurality of the plastic abrasive particles bonded together by a binder to form a shaped mass.

The size of the plastic abrasive particles incorporated into the binder precursor matrix depends on the intended use of the brush or brush segment. For applications requiring cutting or rough finishing, larger plastic abrasive particles are preferred, while plastic abrasive particles having smaller size are preferred for finishing applications. Preferably, the average diameter of the particles is no more than about ½ the diameter of the filament or brush bristle, more preferably no more than about ⅓ of the diameter of the filament or brush bristle.

The plastic abrasive particles will have an average particle size from about 0.1 to about 1500 micrometers, typically between about 1 to about 1300 micrometers, preferably between about 50 to about 500 micrometers and more preferably between about 5 to about 100 micrometers. The average particle size is typically measured by the longest dimension.

The plastic abrasive particles can have any precise shape or can be irregularly or randomly shaped. Examples of such three dimensional shapes includes: pyramids, cylinders, cones, spheres, blocks, cubes, polygons, and the like. Alternatively, the plastic abrasive particles can be relatively flat and have a cross sectional shape such as a diamond, cross, circle, triangle, rectangle, square, oval, octagon, pentagon, hexagon, polygon and the like.

The surface of the plastic abrasive particles (or a portion of their surface, or the entire surface of a portion of the particles may be treated with coupling agents to enhance adhesion to and/or dispersibility in the binder precursor matrix. The plastic abrasive particles are not required to be uniformly dispersed in the hardened composition, but a uniform dispersion may provide more consistent abrasion characteristics.

The plastic abrasive particles can be formed from a thermoplastic material such as polycarbonate, polyetherimide, polyester, polyvinyl chloride, methacrylate, methylmethacrylate, polyethylene, polysulfone, polystyrene, acrylonitrile-butadiene-styrene block copolymer, polypropylene, acetal polymers, polyurethanes, polyamide, and combinations thereof The plastic abrasive particles should have a higher melting or softening point that the binder precursor matrix, so that the plastic particles are not substantially affected by the brush manufacturing process. The plastic particles should be capable of maintaining a generally particulate state during brush processing, and therefore should be selected so as not to substantially melt or soften during the manufacturing process. Further, the plastic abrasive particles should preferably perform the desired surface refinement, such as removing foreign material from the workpiece or providing a fine surface finish, while the binder precursor matrix wears away during operation to continuously present fresh plastic abrasive particles to the workpiece surface.

The average knoop hardness (also referred to as "KNH") of the plastic abrasive particles is generally less than about 80 KNH, and preferably less than about 65 KNH.

Optional Additives

The binder precursor matrix may further include optional additives. Preferably, the optional additives are selected from the group of fillers (including grinding aids), fibers, antistatic agents, antioxidants, catalysts, processing aids, dessicants, UV stabilizers, flame retardants, lubricants, wetting agents, surfactants, pigments, dyes, coupling agents, plasticizers, suspending agents, or mixtures thereof The amounts of these materials are selected to provide the properties desired. One preferred method of incorporating certain additives into the binder precursor matrix is to encapsulate the additives into a shell that is able to withstand RIM temperatures and pressures.

A filler, as is known in the art, may be included in a binder precursor matrix. Examples of useful fillers for this invention include: metal carbonates (such as calcium carbonate (chalk, calcite, marl, travertine, marble and limestone), calcium magnesium carbonate, sodium carbonate, magnesium carbonate), silica (such as quartz, glass beads, glass bubbles and glass fibers), silicates (such as talc, clays, (montmorillonite) feldspar, mica, calcium silicate, calcium metasilicate, sodium aluminosilicate, sodium silicate), metal sulfates (such as calcium sulfate, barium sulfate, sodium sulfate, aluminum sodium sulfate, aluminum sulfate), gypsum, vermiculite, wood flour, aluminum trihydrate, carbon black, metal oxides (such as calcium oxide (lime), aluminum oxide, titanium dioxide) and metal sulfites (such as calcium sulfite). In some instances, the filler may serve as an abrasive particle.

One preferred filler useful in an abrasive article according to the invention is a grinding aid. A grinding aid is defined herein as particulate material that the addition of which has a significant effect on the chemical and physical processes of abrading which results in improved performance. In particular, it is believed in the art that the grinding aid will either 1) decrease the friction between the abrasive particles and the workpiece being abraded, 2) prevent the abrasive particle from "capping", i.e., prevent metal particles from becoming welded to the tops of the abrasive particles, 3) decrease the interface temperature between the abrasive particles the workpiece, or 4) decreases the grinding forces. Examples of grinding aids include waxes, organic halide compounds, halide salts and metals and their alloys. The organic halide compounds will typically break down during abrading and release a halogen acid or a gaseous halide compound. Examples of such materials include, chlorinated fatty acids, and chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include, tin, lead, bismuth, cobalt, antimony, cadmium, iron, and titanium. Other miscellaneous grinding aids include sulfur, organic sulfur compounds, graphite and metallic sulfides.

A dessicant may be added to a binder precursor matrix. In particular, certain commercially available molecular sieves have been used for this purpose. These molecular sieves are typically and preferably alkali metal alumino-silicates, such as $K_{12}[(AlO_2)_{12}(SiO)_{12}] \cdot xH_2O$, which is commercially from UOP Molecular Sieve Absorbents Co. It is also theorized that these molecular sieves, when used in conjunction with certain silane coupling agents, act to catalyze the reaction between the polyfunctional amine and polyfunctional isocyanate.

For some refining applications, it is preferred that the binder precursor matrix include a lubricant. It is believed that the presence of a lubricant in the binder precursor matrix reduces the friction of the bristle contacting the workpiece surface in an abrasive article formed from such a binder precursor matrix. This subsequently reduces the heat generated when refining the workpiece. Excessive heat, when present, may cause the abrasive brush to leave residue on the workpiece or to otherwise harm the workpiece. Suitable lubricants include lithium stearate, zinc stearate, calcium stearate, aluminum stearate, ethylene bis stearamide, graphite, molybdenum disulfide, polytetraflouroethylene (PTFE), and silicone compounds (such as those described in U.S. Pat. No. 5,849,052 to Barber).

Silicone compounds are available in many different forms, e.g., as the compound itself, a dispersible silicone additive (such as that available from Dow Corning under the designation Q2-3238), or as a concentrate. Examples of the polymers into which the polysiloxane can be compounded include polypropylene, polyethylene, polystyrene, polyamides, polyacetal, acrylonitrile-butadiene-styrene (ABS), and polyester elastomer, all of which are commercially available. A silicone modified polymer available under the trade designation HYTREL is available commercially as BY27-010 (or MB50-010), and silicone modified Nylon 6,6 is available commercially as BY27-005 (or MB50-005), both from Dow Corning Company, Midland, Mich. Typically, commercially available concentrates may contain a polysiloxane at a weight percent ranging from 40 to 50; however, any weight percent is acceptable for purposes of the invention as long as the desired weight percent in the final product can be achieved. Lubricants preferably can be present in the binder precursor matrix in amounts of up to about 20 percent by weight (exclusive of abrasive particle content), and preferably in an amount from about 1 to 10 percent, although more or less may be used as desired.

Workpiece

The workpiece can be any type of material such as metal, metal alloys, exotic metal alloys, ceramics, glass, wood, wood like materials, composites, painted surface, plastics, reinforced plastic, stone, or combinations thereof The workpiece may also contain an unwanted layer or coating external over the workpiece surface. This coating may be for example paint, dirt, debris, oil, oxide coating, rust, adhesive, gasket material and the like. The workpiece may be flat or may have a shape or contour associated with it. Examples of workpieces include glass or plastic eye glasses, plastic lenses, glass television screens, metal automotive components, plastic components, particle board, cam shafts, crank shafts, kitchen sinks, bath tubs, furniture, turbine blades, painted automotive components, magnetic media, and the like.

Depending upon the application, the force at the abrading interface can range from about 0.1 kg to over 100 kg. Generally this range is between 1 kg to 50 kg of force at the abrading interface. Also depending upon the application, there may be a liquid present during abrading. This liquid can be water and/or an organic compound. Examples of typical organic compounds include lubricants, oils, emulsified organic compounds, cutting fluids, soaps,.or the like. These liquids may also contain other additives such as defoamers, degreasers, corrosion inhibitors, or the like. The abrasive article may oscillate at the abrading interface during use. In some instances, this oscillation may result in a finer surface on the workpiece being abraded.

The brush article of the invention can be used by hand or used in combination with a machine to refine a surface by cleaning a workpiece surface, including removing paint or other coatings, gasket material, corrosion, or other foreign material. At least one or both of the brush and the workpiece is moved relative to the other. The abrasive article or brush can be converted into a belt, tape rolls, disc, sheet, and the like. Typically brush discs are secured to a back-up pad by an attachment constituent. These brush discs can rotate between 100 to 20,000 revolutions per minute, typically between 1,000 to 15,000 revolutions per minute.

EXAMPLES

The objects, features and advantages of the present invention illustrated in the following examples, which incorporate particular materials and amounts, should not be construed to unduly limit this invention. All materials are commercially available or known to those skilled in the art unless otherwise stated or apparent.

For Examples 1–2, a steel mold was manufactured which would produce a brush having a 7.62 cm (3 in.) circular flat back surface on which were located two peripheral rows of conical bristles. The outer row consisted of 17 bristles equally spaced 21.18 degrees apart and centered on a 3.00 cm (1.18 in.) radius. The inner row also consisted of 17 bristles equally spaced 21.18 degrees apart and centered on a 2.4 cm (0.94 in.) radius. Each conical bristle was 1.5 cm (0.59 in.) long with a 0.6 cm (0.24 in.) diameter base and tapered from the base to a 0.35 cm (0.14 in.) diameter tip.

Materials employed in the preparation of the following examples are listed below.

| Binder Precursor Components | |
|---|---|
| RFA-1000 | a methylene di-p-phenylene isocyanate, from Uniroyal Chemical Corp., Middlebury, CT |
| RFB-0065 | an aromatic amine, from Uniroyal |
| Versalink 1000 | a urethane curing agent, from Air Products Corporation, Allentown, PA |
| Versalink 650 | an aromatic polyamine, from Air Products |
| Isonate 143L | an isocyanate, from Dow Chemical Company of Midland, MI a two-part binder precursor matrix forming an epoxy binder, from Minnesota Mining and Manufacturing Company, St. Paul, MN (utilized herein according to the manufacturer's instructions) |
| DP-420 | |
| Abrasive Particles | |
| SiC | silicon carbide |
| AlO | fused aluminum oxide |
| C201 | iron oxide seeded sol gel aluminum oxide, commercially known as 201 CUBITRON abrasive grain, from Minnesota Mining and Manufacturing Company, St. Paul, MN |

The brushes of Examples 1 and 2 were prepared by filling the mold bristle cavities with Grade 36 brown aluminum oxide abrasive particles and Grade 36 silicon carbide abrasive particles, respectively. The remaining void volume was filled with a two component binder precursor matrix capable of forming a polyurethane binder. An effective amount of abrasive particles was placed in the mold so that the bristle portions were approximately 90–100% filled with particles before the resin was injected. A male-threaded attachment constituent, described in U.S. Pat. No. 3,562,968 (Johnson et al.) was scuffed with a non-woven abrasive web on its side to be bonded to the brush and placed in the mold prior to filling with resin so that the resulting brush had the attachment extending from the back surface.

The binder precursor matrix for both Examples 1 and 2 included RFA-1000 as a first binder precursor component and RFB-0095 as a second binder precursor component. The ratio of the first binder precursor component the second binder precursor component was 100:45 by weight. The components were mix ed form a resin mixture by simultaneously pumping each component through a motionless mixer (part #160-632 from TAH Industries, Inc., Robbinsville, N.J. 08691). Each component was delivered to the mixer with a conventional gear pump. The injection pressure just as the mold was completely filled approached 1000 psi.

The mold was filled with sufficient binder precursor matrix to fill the bristles cavities completely and to provide the base of the brush which was between 0.254 and 0.510 cm (0.100 and 0.200 in.) thick. The mold was placed on a level surface and the binder precursor matrix was allowed to cure at a temperature between 60–80° C. for approximately 1 hour. The brush was removed from the mold and additionally cured from 18–24 hours at 100° C.

The brush of Comparative Example A was an injection molded brush, comprising a thermoplastic resin and aluminum oxide abrasive particles (Grade 50), commercially available from Minnesota Mining and Manufacturing Company, St. Paul, Minn., under the trade designation ROLOC BRISTLE DISC.

The abrasive brush tools described in Examples 1 and 2 were evaluated by comparing them to Comparative Example A for coating removal. Test workpieces (steel test panels) were uniformly prepared by applying a sprayable sealer number 8851 (available from Minnesota Mining and Manufacturing Co., St. Paul, Minn.) onto the steel test panels. Each abrasive tool was mounted on an Hitachi electric grinder with a three inch diameter hard rubber back-up pad (commercially available under the trade designation ROLOC BACK UP PAD, from Minnesota Mining and Manufacturing Company, St. Paul, Minn.) to hold the abrasive tool during the test. The electric grinder operated at 10,000 revolutions per minute. The tests were performed over a period of 1.5 minutes using conventional hand held processes. Removal of the coating via abrasive grinding was evaluated to determine effectiveness of the individual tools. The test results are shown in the table below. Coating removal refers to the grams of coating material removed during the test, calculated by subtracting the final weight of the test workpiece after testing from the initial weight of the test workpiece prior to the test. Disc wear refers to the percent of the abrasive tool tested removed during the test, calculated by the following: (initial weight of the abrasive tool minus the final weight of the abrasive tool) divided by the initial weight of the abrasive tool. This result was then multiplied by 100 to yield the percent disc wear.

TABLE 1

| EXAMPLE | COATING REMOVAL | DISC WEAR (%) |
| --- | --- | --- |
| Comp. Ex. A | 63 | 20 |
| Example 1 | 62 | 2 |
| Example 2 | 66 | 7 |

The results from these comparative tests show that Examples 1 and 2 are as effective as a conventional abrasive article (Comparative Example A) at coating removal, but they exhibit longer life as evidenced by the lower percent wear.

A comparative test was performed utilizing the same conditions described above to remove an automotive underbody coating commercially available as 3 M Brand Product No. 8860 (Minnesota Mining and Manufacturing Co, St. Paul, Minn.). The results are summarized in the table below.

TABLE 2

| EXAMPLE | COATING REMOVAL | DISC WEAR (%) |
| --- | --- | --- |
| Comp. Ex. A | 11 | 17 |
| Example 1 | 7 | 3 |
| Example 2 | 6 | 4 |

This data again demonstrates that the rate of wear is significantly reduced for Examples 1 and 2 compared to Comparative Example A.

For Examples 3–6, a steel mold was manufactured which would produce a brush having a 7.62 cm (3 in.) circular flat back surface on which were located two peripheral rows of conical bristles. The outer row consisted of 32 bristles equally spaced 11.25 degrees apart and centered on a 3.47 cm (1.367 in.) radius. The inner row consisted of 25 bristles equally spaced 14.40 degrees apart and centered on a 2.79 cm (1.099 in.) radius. Each conical bristle was 1.9 cm (0.75 in.) long with a 0.50 cm (0.197 in.) base and had a 5 degree taper from the base to the tip. The tip diameter was 0.19 cm (0.075 in.).

The brushes of Examples 3–6 were prepared by filling the mold with abrasive particles and binder precursor matrix components. Table 3 below lists the ingredients used in preparing Examples 3–6, where the binder precursor matrix components are listed by parts per weight. The abrasive particles were placed in the mold so that the bristles were filled with particles before the binder precursor matrix was inserted. A male-threaded attachment constituent, described in U.S. Pat. No. 3,562,968 (Johnson et al.) was placed in the mold prior to filling with binder precursor matrix so that the resulting brush had the attachment extending from the back surface. The mold was generally filled with sufficient binder precursor matrix to fill the bristles cavities completely and to provide a flat layer (which was the back surface of the brush) between 0.254 and 0.510 cm (0.100 and 0.200 in.) thick. The mold was placed on a level surface and the binder precursor matrix was allowed to cure at 60–80° C. for approximately 1 hour. It was then removed from the mold and post cured for an additional 18–24 hours at 100° C.

Examples 3–6 were tested by mounting the brush on a 7.62 cm (3 in.) back-up pad designed to accept the attachment constituent. The back-up pad was secured to an electric right angle grinder (commercially available from Robert Bosch GmbH, Stuttgart, Germany) which was secured in an upright position.

TABLE 3

| Binder components Ex. (parts) | Abrasive (Grade) | Qualitative Result (test conditions as in Examples 1 & 2) |
| --- | --- | --- |
| 3 100 parts Versalink 1000:25 parts Isonate 143L | AlO (60) | Very good removal of paint and rust |
| 4 100 parts RFA-1000: 45 parts RFB-0065 | SiC (36) | Excellent rust removal, some bristle breakage at the root area was observed |
| 5 DP-420 (Epoxy binder) | SiC (36) | Excellent removal of scale and weld spatter |
| 6 100 parts RFA-1000: 45 parts RFB-0065 | AlO (60) | Good paint and rust removal. Some bristles broke during operation |

The data in Table 3 shows that these reaction injection molding abrasive tools made via a reaction injection molding process are effective at paint, rust and weld spatter removal from metallic surfaces.

Patents and patent applications disclosed herein are hereby incorporated by reference as if individually incorporated. It is to be understood that the above description is intended to be illustrative, and not restrictive. Various modifications and alterations of this invention will become apparent to those skilled in the art from the foregoing description without departing from the scope and the spirit of this invention, and should be understood that this invention is not to be unduly limited to the illustrate embodiments set forth herein.

What is claimed is:

1. An integrally molded abrasive article comprising:

a base having a first side and a second side;

a plurality of bristles integrally molded with and extending from the first side of the base;

wherein the base comprises a binder formed from a binder precursor matrix comprising at least two interactive components which form a polyurethane/urea binder; and at least a portion of the plurality of bristles comprise a plurality of abrasive particles adhered within the binder such that the ratio of binder to abrasive particles is at least 1:3 by weight.

2. The integrally molded abrasive article of claim 1, wherein the plurality of abrasive particles comprises a material selected from the group consisting of an inorganic material, an organic material, and an agglomerate thereof.

3. The integrally molded abrasive article of claim 1, further comprising an attachment constituent on the second side of the base.

* * * * *

UNITED STATES PATENT AND TRADEMARK OFFICE
CERTIFICATE OF CORRECTION

PATENT NO. : 6,413,287 B1
DATED : July 2, 2002
INVENTOR(S) : Barber, Loren L. Jr.

It is certified that error appears in the above-identified patent and that said Letters Patent is hereby corrected as shown below:

<u>Title page,</u>
Item [56], FOREIGN PATENT DOCUMENT, "0 330 512" should read -- 3 330 512 --.

<u>Column 4,</u>
Line 38, delete "." following "material".

<u>Column 12,</u>
Line 16, delete "." following "may".
Line 36, ";" should read -- . --.

<u>Column 14,</u>
Line 42, delete "to" following -- onto --.

<u>Column 18,</u>
Lines 51 and 59, insert -- . -- after "thereof".

<u>Column 19,</u>
Line 45, "dianitlne" should read -- dianiline --.

<u>Column 20,</u>
Line 9, "know" should read -- known --.

<u>Column 22,</u>
Line 61, insert -- . -- following "thereof".
Line 62, insert -- than -- following "point".

<u>Column 23,</u>
Line 17, insert -- . -- following "thereof".
Line 50, insert -- and -- following "particles".

<u>Column 24,</u>
Line 3, insert -- available -- following "commercially"
Line 49, insert -- . -- following "thereof".

UNITED STATES PATENT AND TRADEMARK OFFICE
CERTIFICATE OF CORRECTION

PATENT NO.    : 6,413,287 B1
DATED         : July 2, 2002
INVENTOR(S)   : Barber, Loren L. Jr.

It is certified that error appears in the above-identified patent and that said Letters Patent is hereby corrected as shown below:

Column 26,
Line 12, insert -- to -- following "component".
Line 15, "med ed form" should read -- mixed to form --.
Line 24, "bristles" should read -- bristle --.

Signed and Sealed this

First Day of July, 2003

JAMES E. ROGAN
*Director of the United States Patent and Trademark Office*